United States Patent
Tang et al.

(10) Patent No.: US 12,363,504 B2
(45) Date of Patent: Jul. 15, 2025

(54) BLUETOOTH POSITIONING DEVICE DETECTION METHOD, DEVICE, AND STORAGE MEDIUM

(71) Applicant: HONOR DEVICE CO., LTD., Shenzhen (CN)

(72) Inventors: Nengfu Tang, Shenzhen (CN); Bin Yan, Shenzhen (CN); Weilin Gong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 5 days.

(21) Appl. No.: 17/926,928

(22) PCT Filed: Apr. 22, 2022

(86) PCT No.: PCT/CN2022/088330
§ 371 (c)(1),
(2) Date: Nov. 21, 2022

(87) PCT Pub. No.: WO2022/257617
PCT Pub. Date: Dec. 15, 2022

(65) Prior Publication Data
US 2024/0171941 A1    May 23, 2024

(30) Foreign Application Priority Data

Jun. 9, 2021 (CN) .......................... 202110644509.X
Sep. 18, 2021 (CN) .......................... 202111097431.0

(51) Int. Cl.
H04W 4/029    (2018.01)
H04W 4/02    (2018.01)
(Continued)

(52) U.S. Cl.
CPC .......... *H04W 4/029* (2018.02); *H04W 4/027* (2013.01); *H04W 4/12* (2013.01); *H04W 4/80* (2018.02)

(58) Field of Classification Search
CPC ......... H04W 4/50; H04W 4/02; H04W 4/025; H04W 12/02; H04W 4/029; H04W 4/80; H04W 4/027; H04W 4/12
See application file for complete search history.

(56) References Cited

U.S. PATENT DOCUMENTS 9,967,711 B1 * 5/2018 Cannings .............. G01S 5/0205
10,419,888 B2    9/2019 Ye
(Continued)

FOREIGN PATENT DOCUMENTS

CA    2982610 A1 *    4/2018 ............. G08B 21/02
CN    103901889 A    7/2014
(Continued)

OTHER PUBLICATIONS

Stalyar, "AirTags are scarily good at tracking items and . . . people. I know because I tried", Mashable, Apr. 30, 2021 (Year: 2021).*

*Primary Examiner* — Dung Hong
(74) *Attorney, Agent, or Firm* — WOMBLE BOND DICKINSON (US) LLP

(57) ABSTRACT

This application provides a Bluetooth positioning device detection method, a device, and a storage medium. The method includes: recording first location information, where a set of the first location information is used as a first track, and the first track is a moving track of a first electronic device; recording second location information when a preset trigger condition is met, where a set of the second location information is used as a second track, and the second track is used to represent a moving track of a Bluetooth positioning device; calculating a similarity between the first track and the second track in a preset time period; and determining (Continued)

that the first electronic device is tracked by the Bluetooth positioning device if the track similarity is greater than a preset similarity threshold.

20 Claims, 21 Drawing Sheets

(51) Int. Cl.
*H04W 4/12* (2009.01)
*H04W 4/80* (2018.01)

(56) References Cited

U.S. PATENT DOCUMENTS

| | | | | |
|---|---|---|---|---|
| 10,640,084 | B1* | 5/2020 | Conners | H04W 4/02 |
| 2002/0044661 | A1 | 4/2002 | Jakobsson et al. | |
| 2007/0264974 | A1 | 11/2007 | Frank et al. | |
| 2012/0021760 | A1* | 1/2012 | Strohbach | G01S 5/0289 |
| | | | | 455/456.1 |
| 2015/0024787 | A1* | 1/2015 | Ben-Itzhak | H04W 12/02 |
| | | | | 455/456.4 |
| 2016/0020861 | A1* | 1/2016 | Jin | H04W 4/023 |
| | | | | 455/456.1 |
| 2017/0023377 | A1* | 1/2017 | Burtner | G08B 13/2462 |
| 2018/0184286 | A1* | 6/2018 | Patterson | H04W 12/02 |
| 2018/0270612 | A1* | 9/2018 | Thoresen | G01S 1/02 |
| 2019/0045332 | A1* | 2/2019 | Ye | H04L 67/10 |
| 2019/0073101 | A1* | 3/2019 | Li | G06F 3/0483 |
| 2019/0147311 | A1* | 5/2019 | Purba | G06K 19/07713 |
| | | | | 340/572.1 |
| 2019/0200203 | A1* | 6/2019 | Jiang | H04L 63/0861 |
| 2020/0034928 | A1* | 1/2020 | Lim | G06Q 10/0833 |
| 2021/0021962 | A1* | 1/2021 | Diaz Fuente | H04W 64/006 |

FOREIGN PATENT DOCUMENTS

| | | | | | |
|---|---|---|---|---|---|
| CN | 103997712 | A | | 8/2014 | |
| CN | 105933857 | A | * | 9/2016 | ............ H04W 4/029 |
| CN | 205547727 | U | | 9/2016 | |
| CN | 106161791 | A | | 11/2016 | |
| CN | 106504484 | A | | 3/2017 | |
| CN | 106572430 | A | | 4/2017 | |
| CN | 107864284 | A | | 3/2018 | |
| CN | 108307380 | A | | 7/2018 | |
| CN | 108513250 | A | | 9/2018 | |
| CN | 108646736 | A | | 10/2018 | |
| CN | 109561417 | A | | 4/2019 | |
| CN | 110865400 | A | | 3/2020 | |
| CN | 111148215 | A | * | 5/2020 | .......... H04W 64/006 |
| CN | 112116805 | A | * | 12/2020 | ............ G06Q 10/047 |
| CN | 112135259 | A | | 12/2020 | |
| CN | 112153562 | A | | 12/2020 | |
| CN | 112419120 | A | * | 2/2021 | ......... G06K 9/00785 |
| CN | 112672286 | A | | 4/2021 | |
| CN | 114173325 | A | | 3/2022 | |
| JP | 2010277452 | A | | 12/2010 | |
| KR | 20190064972 | A | | 6/2019 | |
| SG | 10201800602 | U | * | 3/2018 | |
| WO | 2020144367 | A1 | | 7/2020 | |
| WO | 2021025965 | A1 | | 2/2021 | |

* cited by examiner

BLUETOOTH POSITIONING DEVICE DETECTION METHOD, DEVICE, AND STORAGE MEDIUM

CROSS-REFERENCE TO RELATED APPLICATIONS

This application is a national stage of International Application No. PCT/CN2022/088330 filed on Apr. 22, 2022, which claims priority to Chinese Patent Application No. 202110644509.X, filed on Jun. 9, 2021, and claims priority to Chinese Patent Application No. 202111097431.0, filed on Sep. 18, 2021. The disclosures of all the aforementioned application are hereby incorporated by reference in their entireties.

TECHNICAL FIELD

This application relates to the field of Bluetooth technologies, and in particular, to a Bluetooth positioning device detection method, a device, and a storage medium.

BACKGROUND

With development of Bluetooth technologies, a plurality of Bluetooth devices with different functions such as a Bluetooth headset and a Bluetooth speaker appear in the market. A user may connect a Bluetooth device to an electronic device such as a mobile phone or a tablet computer, so as to provide a plurality of extended functions for the electronic device.

Some Bluetooth devices have a positioning function and these Bluetooth devices may be referred to as Bluetooth positioning devices. When the user carries one or more Bluetooth positioning devices, Bluetooth signals broadcast by the Bluetooth positioning devices to surrounding devices may trigger the surrounding devices to upload location information of the Bluetooth positioning devices to the network, thereby resulting in leakage of the user's location.

SUMMARY

This application provides a Bluetooth positioning device detection method, a device, and a storage medium, so as to detect whether an electronic device is tracked by a Bluetooth positioning device.

To implement the foregoing objectives, the following technical solutions are provided in this application:

A first aspect of this application provides a Bluetooth positioning device detection method, applied to a first electronic device, where the method includes:
  recording first location information, where a set of the first location information is used as a first track, and the first track is a moving track of the first electronic device;
  recording second location information when a preset trigger condition is met, where a set of the second location information is used as a second track, and the second track is used to represent a moving track of a Bluetooth positioning device;
  calculating a similarity between the first track and the second track in a preset time period; and
  determining that the first electronic device is tracked by the Bluetooth positioning device if the track similarity is greater than a preset similarity threshold.

In some optional embodiments, the recording first location information includes:
  periodically recording the first location information of the first electronic device after a Bluetooth module of the first electronic device obtains a preset Bluetooth status signal through scanning, where the Bluetooth status signal is sent by a second electronic device and the second electronic device is different from the first electronic device.

In some optional embodiments, the trigger condition is that when the Bluetooth module of the first electronic device detects a preset Bluetooth identification signal through scanning, the Bluetooth identification signal is sent by the Bluetooth positioning device.

In some optional embodiments, the recording second location information includes:
  identifying the Bluetooth positioning device that sends the Bluetooth identification signal based on received signal strength indication (Received Signal Strength Indication, RSSI) data of the Bluetooth identification signal and an identity carried by the Bluetooth identification signal; and
  recording the second location information based on the Bluetooth positioning device that sends the Bluetooth identification signal.

In some optional embodiments, both the first location information and the second location information include a base station identifier of a base station currently accessed by the first electronic device.

In some optional embodiments, both the first location information and the second location information include a network identifier of a wireless network currently accessed by the first electronic device.

In some optional embodiments, both the first location information and the second location information include a geographical coordinate in which the first electronic device is currently located.

In some optional embodiments, the method further includes:
  scanning a Bluetooth signal.

In some optional embodiments, the scanning a Bluetooth signal includes:
  scanning the Bluetooth signal once every preset scanning period.

In some optional embodiments, before the scanning a Bluetooth signal includes:
  constructing a signal filter in response to a preset enabling operation; and
  configuring the signal filter to the Bluetooth module of the first electronic device.

In some optional embodiments, the constructing a signal filter in response to a preset enabling operation includes:
  constructing the signal filter in response to the screen-on operation received by the first electronic device.

In some optional embodiments, the constructing a signal filter in response to a preset enabling operation includes:
  constructing the signal filter in response to a program start operation received by the first electronic device, where the program is configured for the first electronic device and is used to provide a tracking detection function.

In some optional embodiments, the signal filter includes an identification signal filter used to filter a Bluetooth identification signal, and a status signal filter used to filter a Bluetooth status signal.

In some optional embodiments, the Bluetooth identification signal is a Findmy signal, and the identification signal filter is a Findmy filter; and the Bluetooth status signal is a nearby signal, and the status signal filter is a nearby filter.

In some optional embodiments, the calculating a similarity between the first track and the second track in a preset time period includes:

obtaining any one or a combination of a first similarity, a second similarity, and a third similarity, where the first similarity is a similarity between a base station identifier in the first track and a base station identifier in the second track; the second similarity is a similarity between a network identifier in the first track and a network identifier in the second track; and the third similarity is a similarity between geographical coordinates in the first track and geographical coordinates in the second track; and determining the track similarity based on any one or a combination of the first similarity, the second similarity and the third similarity.

In some optional embodiments, the obtaining a first similarity includes:

obtaining a residence time corresponding to each base station identifier in the first track, where the residence time corresponding to the base station identifier is duration in which the first electronic device accesses the base station corresponding to the base station identifier;

determining a weight corresponding to the base station identifier based on the residence time corresponding to the base station identifier; and calculating a ratio of a total quantity of base station identifiers in the second track to a total weight of the first track to obtain the first similarity, where the total weight of the first track is a sum of weights corresponding to all base station identifiers in the first track.

In some optional embodiments, the determining a weight corresponding to the base station identifier based on the residence time corresponding to the base station identifier includes:

determining whether the residence time corresponding to the base station identifier is greater than a broadcast interval, where the broadcast interval is a time interval at which the Bluetooth positioning device sends the Bluetooth identification signal; and setting the weight corresponding to the base station identifier to a preset first weight if the residence time corresponding to the base station identifier is greater than the broadcast interval; or setting the weight corresponding to the base station identifier to a ratio of the residence time corresponding to the base station identifier to the broadcast interval if the residence time corresponding to the base station identifier is less than or equal to the broadcast interval.

In some optional embodiments, the obtaining a second similarity includes:

obtaining a residence time corresponding to each network identifier in the first track, where the residence time corresponding to the network identifier is duration in which the first electronic device accesses the wireless network corresponding to the network identifier;

determining a weight corresponding to the network identifier based on the residence time corresponding to the network identifier; and calculating a ratio of a total quantity of network identifiers in the second track to a total weight of the first track to obtain the first similarity, where the total weight of the first track is a sum of weights corresponding to all network identifiers in the first track.

In some optional embodiments, the determining a weight corresponding to the network identifier based on the residence time corresponding to the network identifier includes:

determining whether the residence time corresponding to the network identifier is greater than the broadcast interval, where the broadcast interval is a time interval at which the Bluetooth positioning device sends the Bluetooth identification signal; and setting the weight corresponding to the network identifier to a preset first weight if the residence time corresponding to the base station identifier is greater than the broadcast interval; or setting the weight corresponding to the network identifier to a ratio of the residence time corresponding to the network identifier to the broadcast interval if the residence time corresponding to the network identifier is less than or equal to the broadcast interval.

In some optional embodiments, the obtaining a third similarity includes:

counting a quantity of pairs of overlapping coordinates between the first track and the second track, where each pair of overlapping coordinates between the first track and the second track comprises one geographical coordinate of the first track and one geographical coordinate of the second track, and a distance between two geographical coordinates in each pair of overlapping coordinates is less than a preset distance threshold; and calculating a ratio of the quantity of pairs of overlapping coordinates to a total quantity of geographical coordinates in the first track to obtain the third similarity.

In some optional embodiments, the determining the track similarity based on any one or a combination of the first similarity, the second similarity and the third similarity includes:

determining the first similarity as the track similarity; or, determining the second similarity as the track similarity; or, determining the third similarity as the track similarity; or, determining an average value of the first similarity, the second similarity, and the third similarity as the track similarity.

In some optional embodiments, after the determining that the first electronic device is tracked by the Bluetooth positioning device, the method further includes:

prompting a user of the first electronic device that the user is tracked by the Bluetooth positioning device.

In some optional embodiments, the prompting a user of the first electronic device that the user is tracked includes:

outputting a tracking prompt message in a message notification bar, where the tracking prompt message is used to indicate that the user is tracked.

In some optional embodiments, the prompting a user of the first electronic device that the user is tracked by the Bluetooth positioning device includes:

displaying a message pop-up window on a display, where the message pop-up window is used to present a prompt message, and the prompt message is used to indicate that the user is tracked.

In some optional embodiments, the prompting a user of the first electronic device that the user is tracked by the Bluetooth positioning device includes:

sending a prompt signal to a Bluetooth peripheral that is worn by the user and that is connected to the first electronic device through Bluetooth, where the prompt signal is used to trigger the Bluetooth peripheral to perform vibration or output a prompt tone.

In some optional embodiments, the method further includes:
deleting the first location information and the second location information.

In some optional embodiments, the deleting the first location information and the second location information includes:
periodically deleting the first location information and the second location information.

In some optional embodiments, deleting the second location information includes:
in response to the user setting the Bluetooth positioning device as a secure Bluetooth positioning device, deleting the second location information corresponding to the Bluetooth positioning device.

A second aspect of this application provides an electronic device, where the first electronic device includes one or more processors, a memory, and a display;
the memory is configured to store one or more programs; and
the one or more processors are configured to execute the one or more programs, so that the electronic device performs the Bluetooth positioning device detection method provided in any one of the first aspect of this application.

A third aspect of this application provides a computer storage medium, configured to store a computer program. When the computer program is executed, the computer program is specifically configured to implement the Bluetooth positioning device detection method provided in any one of the first aspect of this application.

According to the method and apparatus described in this application, this application provides a Bluetooth positioning device detection method, a device, and a storage medium. The method includes: recording a first track and a second track, where the first track is a moving track of an electronic device, and the second track is a moving track of a Bluetooth positioning device; calculating a track similarity between the first track and the second track; and determining that the electronic device is tracked by the Bluetooth positioning device if the track similarity is greater than a preset similarity threshold. In this solution, it can be detected that whether the electronic device is tracked by the Bluetooth positioning device, and a prompt is given when the electronic device is tracked by the Bluetooth positioning device, so as to prevent the electronic device from being tracked by the Bluetooth positioning device.

DESCRIPTION OF EMBODIMENTS

Terms such as "first", "second", and "third" in the application, claims, and description of drawings are used to distinguish different objects, rather than to limit a specific sequence.

In embodiments of this application, words such as "exemplary" or "for example" are used to indicate examples or descriptions. Any embodiment or design solution described as "exemplary" or "example" in the embodiments of this application should not be construed as being more preferred or advantageous than other embodiments or design solutions. Specifically, using words such as "exemplary" or "for example" is intended to present related concepts in a specific manner.

Figure 1:
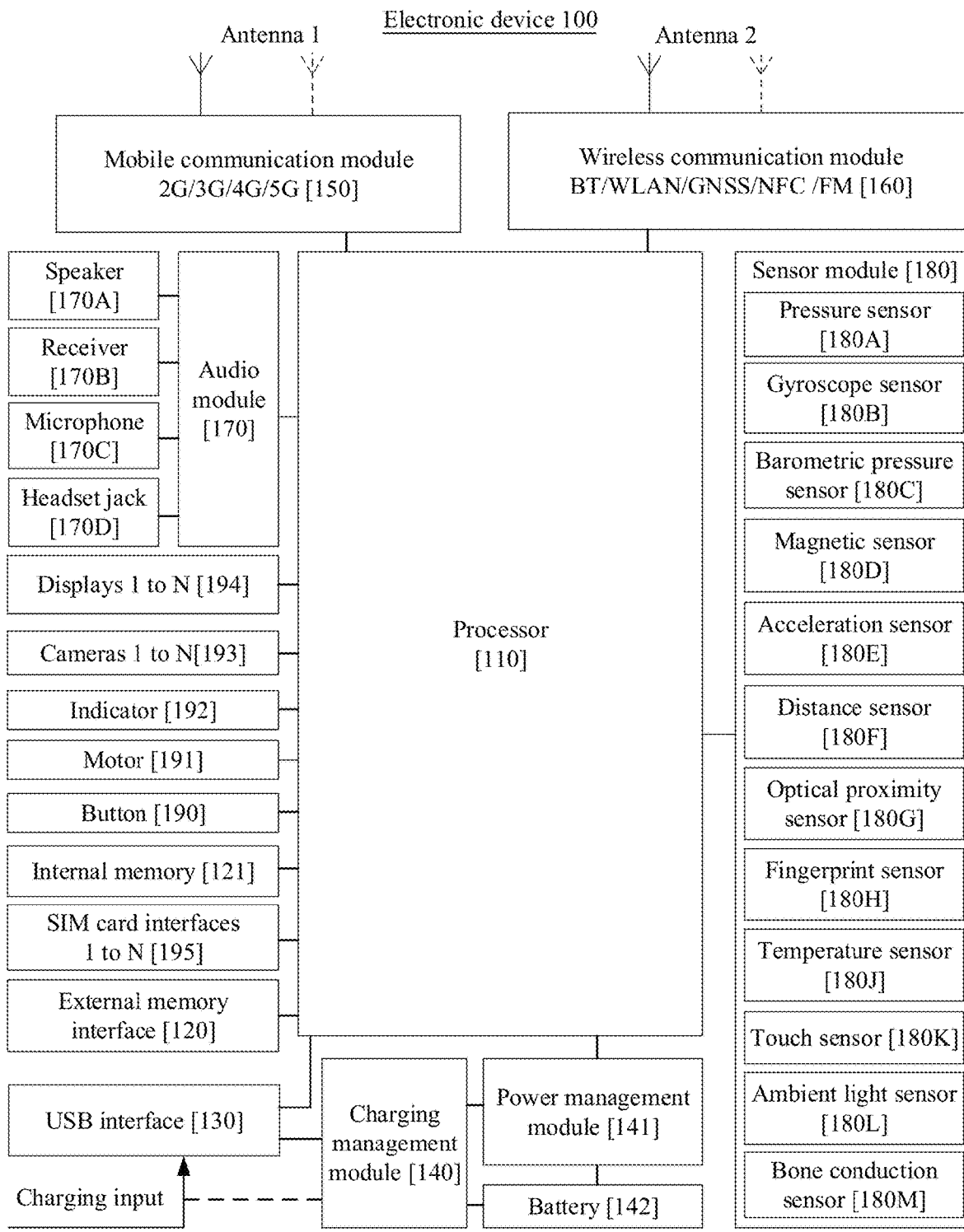
FIG. 1 is a schematic diagram of a structure of an electronic device disclosed in an embodiment of this application.

A Bluetooth positioning device detection method provided in this application is applicable to an electronic device that has a Bluetooth communication capability. FIG. 1 is a schematic diagram of a structure of an electronic device that has a Bluetooth communication capability. The electronic device 100 may be a device such as a mobile phone or a tablet computer.

As shown in FIG. 1, the electronic device 100 may include a processor 110, an external memory 120, an internal memory (also referred to as "memory") 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset interface 170D, a sensor module 180, a button 190, a motor 191, an indicator 192, a camera 193, a display 194, and a subscriber identification module (subscriber identification module, SIM) interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be independent components, or may be integrated into one or more processors.

A memory may be disposed in the processor 110, and is configured to store an instruction and data. In some embodiments, the memory in the processor 110 is a cache memory. The memory may store an instruction or data that has just been used or is cyclically used by the processor 110. If the processor 110 needs to use the instruction or the data again, the instruction or the data may be directly invoked from the memory. Therefore, repeated access is avoided, a waiting time of the processor 110 is reduced, and system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI) interface, a general-purpose input/output (general-purpose input/output, GPIO) interface, a subscriber identity module (subscriber identity module, SIM) interface, and/or a universal serial bus (universal serial bus, USB) interface, and the like.

The USB interface 130 is an interface conforming to a USB standard specification, and may be specifically a Mini USB interface, a Micro USB interface, a USB Type C interface, or the like. The USB interface 130 may be configured to connect a charger to charge the electronic device 100, or may be configured to transmit data between the electronic device 100 and a peripheral device. The USB interface 130 may also be configured to connect to a headset and play audio by using the headset. The interface may be further configured to connect to another electronic device, such as an AR device.

It may be understood that an interface connection relationship between the modules that is shown in this embodiment of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to detect the charging input from a charger. The charger may be a wireless charger, or may be a wired charger. In some embodiments of the wired charger, the charging management module 140 may detect the charging input of the wired charger through the USB interface 130. In some embodiments of the wireless charger, the charging management module 140 may detect wireless charging input by using a wireless charging coil of the electronic device 100. While charging the battery 142, the charging management module 140 may further supply power to an electronic device by using the power management module 141.

The power management module 141 is configured to connect the battery 142, the charging management module 140 and the processor 110. The power management module 141 detects input of the battery 142 and/or the charging management module 140, and supplies power to the processor 110, the internal memory 121, the external memory 120, the display 194, the camera 193, and the wireless communication module 160, and the like. The power management module 141 may be further configured to monitor parameters such as a battery capacity, a battery cycle quantity, and a battery health status (leakage and impedance). In some other embodiments, the power management module 141 may also be disposed on the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and detect an electromagnetic wave signal. Each antenna in the electronic device 100 may be configured to cover a single or a plurality of communication frequency bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communication module 150 may provide a wireless communication solution, including 2G/3G/4G/5G or the like, that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal obtained after modulation by the modem processor, and convert the signal into an electromagnetic wave through the antenna 1 for radiation. In some embodiments, at least a part of functional modules of the mobile communication module 150 may be disposed on the processor 110. In some embodiments, at least a part of the functional modules of the mobile communication module 150 and at least a part of modules of the processor 110 may be disposed in a same component.

The modem processor may include a modulator and a demodulator. The modulator is configured to modulate a to-be-sent low-frequency baseband signal into an intermediate-and-high frequency signal. The demodulator is configured to demodulate a detected electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (not limited to the speaker 170A, the receiver 170B, or the like), or displays an image or a video on the display 194. In some embodiments, the modem processor may be an independent component. In some other embodiments, the modem processor may be independent of the processor 110 and disposed in a same component with the mobile communication module 150 or other functional modules.

The wireless communication module 160 may provide a solution to wireless communication applied to the electronic device 100, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication technology (near field communication, NFC), and an infrared technology (infrared, IR). The wireless communication module 160 may be one or more components that integrate at least one communication processing module. The wireless communication module 160 detects an electromagnetic wave over the antenna 2, performs frequency modulation and filtering processing on an electromagnetic wave signal, and sends a processed signal to the processor 110. The wireless communication module 160 may further detect a to-be-sent signal from the processor 110, perform frequency modulation and amplification on the signal, and convert the signal into an electromagnetic wave for radiation over the antenna 2. For example, the wireless communication module 160 may include a Bluetooth module, a Wi-Fi module, and the like.

In some embodiments, the antenna 1 of the electronic device 100 is coupled to the mobile communication module 150, and the antenna 2 is coupled to the wireless communication module 160, so that the electronic device 100 may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, and/or an IR technology, and the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation systems (satellite based augmentation systems, SBAS).

In this embodiment, the wireless communication module may specifically include a Bluetooth module and a satellite positioning module.

The Bluetooth module may provide a solution for Bluetooth wireless communication applied to the electronic device. The Bluetooth module includes a Bluetooth controller. The Bluetooth controller is a chip integrated in the Bluetooth module. The Bluetooth controller may control the Bluetooth module to scan a Bluetooth signal, and report the Bluetooth signal detected through scanning to the processor.

In some embodiments, the Bluetooth module may periodically scan to obtain a Bluetooth signal sent by a Bluetooth positioning device, and then report the Bluetooth signal sent by the Bluetooth positioning device to the processor of the electronic device. After receiving the Bluetooth signal of the Bluetooth positioning device, the processor sends location information of the electronic device to a server. The Bluetooth module receives a signal from the Bluetooth positioning device, which indicates that the Bluetooth positioning device is located near the electronic device. Therefore, the location information reported by the electronic device is equivalent to location information of the Bluetooth positioning device.

In some embodiments, the processor may configure one or more signal filters for the Bluetooth controller. The Bluetooth controller identifies, by using the signal filter, a corresponding Bluetooth signal through filtering from the Bluetooth signals detected through scanning, and reports the Bluetooth signal identified through filtering to the processor, so as to trigger the processor to record location information.

The satellite positioning module may determine, based on a positioning system, such as a Global Positioning System (Global Positioning System, GPS) and a Beidou system, a geographic location of the electronic device, that is, a latitude and longitude of the location of the electronic device.

The electronic device 100 implements a display function by using the GPU, the display 194, the application processor, and the like. The GPU is a microprocessor for image processing, and is connected to the display 194 and the application processor. The GPU is configured to perform mathematical and geometric calculation and is configured to perform graphics rendering. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active matrix organic light emitting diode (active-matrix organic light emitting diode, AMOLED), a flex light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, a ray of light is transmitted to a light-sensitive element of the camera through a lens, an optical signal is converted into an electrical signal, and the light-sensitive element of the camera transmits the electrical signal to the ISP for processing, so as to convert the electrical signal into an image visible to the naked eyes. The ISP may further perform algorithm optimization on noise, luminance, and complexion of an image. The ISP may further optimize parameters such as exposure and color temperature of a photographing scene. In some embodiments, the ISP may be disposed on the camera 193.

The camera 193 is configured to capture a still image or a video. An optical image of an object is generated by using a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the electronic device 100 may include one or N displays 193, where N is a positive integer greater than 1.

The external memory 120 generally refers to an external storage. In this embodiment of this application, the external memory refers to a memory except a memory of the electronic device and a cache of the processor, and the memory is generally a non-volatile memory. Common external memories include a hard disk, a floppy disk, an optical disc, a USB flash drive, a Micro SD card, and the like, which are used to expand a storage capability of the electronic device 100. The external memory may communicate with the processor 110 through an external memory interface or a bus, to implement a data storage function. For example, files such as music and a video is stored in the external memory card.

The internal memory 121 may also be referred to as a "memory", and may be configured to store computer-executable program code, where the computer-executable program code includes instructions. The internal memory 121 may include a program storage area and a data storage area. The program storage area may store an operating system, an application (for example, a sound playback function or an image playback function) required by at least one function, and the like. The data storage area may store data (for example, audio data and an address book) and the like created when the electronic device 100 is used. In addition, the internal memory 121 may include a high-speed random access memory, or may include a non-volatile memory such as at least one disk memory, a flash memory, or a universal flash storage (universal flash storage, UFS). The processor 110 executes various functional applications of the electronic device 100 and data processing by running instructions stored in the internal memory 121 and/or instructions stored in the memory disposed in the processor.

The electronic device 100 may implement audio functions by using the audio module 170, the speaker 170A, the receiver 170B, the microphone 170C, the headset jack 170D, the application processor, and the like. The audio functions are, for example, music playback and recording.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed on the processor 110, or a part of functional modules of the audio module 170 may be disposed on the processor 110.

The speaker 170A, also referred to as a "loudspeaker", is configured to convert an audio electrical signal into a sound signal. The electronic device 100 may be used to listen to music or listen to a hands-free call through the speaker 170A.

The receiver 170B, also referred to as an "earpiece", is configured to convert an audio electrical signal into a sound signal. When the electronic device 100 answers a telephone call or a voice message, the receiver 170B may be placed near a person's ear to answer the voice.

The microphone 170C, also referred to as a "mike" or a "mic", is configured to convert a sound signal into an electrical signal. When making a call or sending a voice message, the user may make a sound through a mouse near the microphone 170C, and input a sound signal to the microphone 170C. At least one microphone 170C may be disposed on the electronic device 100. In some other embodiments, two microphones 170C may be disposed on the electronic device 100, and in addition to collecting a sound signal, a noise reduction function may be implemented. In some other embodiments, three, four, or more microphones 170C may be disposed on the electronic device 100, so as to collect a sound signal, reduce noise, identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The button 190 includes a power-on button, a volume button, and the like. The button 190 may be a mechanical button. The button 190 may also be a touch-sensitive button. The electronic device 100 may receive a button input, and generate a button signal input related to user setting and function control of the electronic device 100.

The motor 191 may generate a vibration prompt. The motor 191 may be used for an incoming call vibration prompt, or may be used for touch vibration feedback. For example, a touch operation performed on different applications (for example, photographing and audio playback) may correspond to different vibration feedback effects. For touch operations performed in different areas of the display 194, the motor 191 may correspond to different vibration feedback effects. Different application scenarios (for example, a time reminder, receiving messages, an alarm clock, and a game) may also correspond to different vibration feedback effects. The touch vibration feedback effects may further support customization.

The indicator 192 may be an indicator light, configured to indicate a charging status, a power change, and further to indicate a message, a missed call, a notification, and the like.

The SIM card interface 195 is configured to connect to a SIM card. The SIM card may be inserted into the SIM card interface 195 or pulled out of the SIM card interface 195, so that the SIM card is in contact with or separated from the electronic device 100. The electronic device 100 may support one or N SIM card interfaces, where N is a positive integer greater than 1. The SIM card interface 195 may support a Nano SIM card, a Micro SIM card, a SIM card, and the like. A plurality of cards may be inserted into a same SIM card interface 195. Types of the plurality of cards may be same or different. The SIM card interface 195 may be compatible with different types of SIM cards. The SIM card interface 195 may also be compatible with an external storage card. The electronic device 100 interacts with a network by using the SIM card, so as to implement functions such as a call and data communication. In some embodiments, the electronic device 100 uses an eSIM, that is, an embedded SIM card. The eSIM card may be embedded in the electronic device 100, and cannot be separated from the electronic device 900.

The foregoing specifically describes the embodiments of this application by using the electronic device 100 as an example. It should be understood that a structure shown in the embodiment of this application does not constitute a specific limitation on the electronic device 100. The electronic device 100 may have more or fewer components than those shown in the figure, may combine two or more components, or may have different component configurations. Various components shown in the figure may be implemented in hardware, software, or a combination of hardware and software including one or more signal processing and/or application-specific integrated circuits.

The electronic device provided in this embodiment of this application may be user equipment (user equipment, UE), such as an electronic device (for example, a user mobile phone), a tablet computer, a desktop computer, a laptop computer, a handheld computer, a netbook, or a personal digital assistant (personal digital assistant, PDA).

In some embodiments, the electronic device may be a device with a Bluetooth function, and a Bluetooth positioning device may be considered as a device with a positioning function among these devices with a Bluetooth function.

The Bluetooth positioning device in the embodiments of this application may be an electronic device with a Bluetooth function that is used to help a user find and locate an item. A specific type of the Bluetooth positioning device is not limited in the embodiments of this application.

In some possible embodiments, the Bluetooth positioning device may be a small electronic device with a Bluetooth function.

The following briefly describes a working principle of the Bluetooth positioning device.

A user A that holds a Bluetooth positioning device may establish a Bluetooth connection between the Bluetooth positioning device and a mobile phone of the user A, and place the Bluetooth positioning device together with any personal item, for example, fasten the Bluetooth positioning device to a key or place the Bluetooth positioning device in a bag.

After the foregoing operation, for one aspect, when the Bluetooth positioning device is located near the mobile phone of the user A, the user A may control the Bluetooth positioning device to emit a prompt tone by using an application on the mobile phone, so as to help the user A find an item that is placed together with the Bluetooth positioning device. In addition, the mobile phone may further determine relative positions of a nearby Bluetooth positioning device and the mobile phone by using a Bluetooth technology. By viewing the relative positions of the Bluetooth positioning device and the mobile phone on the mobile phone, the user A may find the nearby Bluetooth positioning device and an item placed together. For another aspect, when the Bluetooth positioning device is far away from the mobile phone of the user A and the Bluetooth connection is disconnected, the Bluetooth positioning device may periodically send an identification signal that carries an identity of the Bluetooth positioning device to a surrounding electronic device. After receiving the identification signal, the surrounding electronic device (which may be denoted as an electronic device B) uploads location information of the electronic device B to a server, so that the mobile phone of the user A may obtain the location of the electronic device B from the server. The electronic device B can receive the identification signal of the Bluetooth positioning device, which indicates that the electronic device B is close to the Bluetooth positioning device. In this case, the location information of the electronic device B may be considered as location information of the Bluetooth positioning device. The user A obtains the location information of the electronic device B from the server by using the mobile phone, and the location information may be used to search for the Bluetooth positioning device and the item placed together.

Figure 2A:
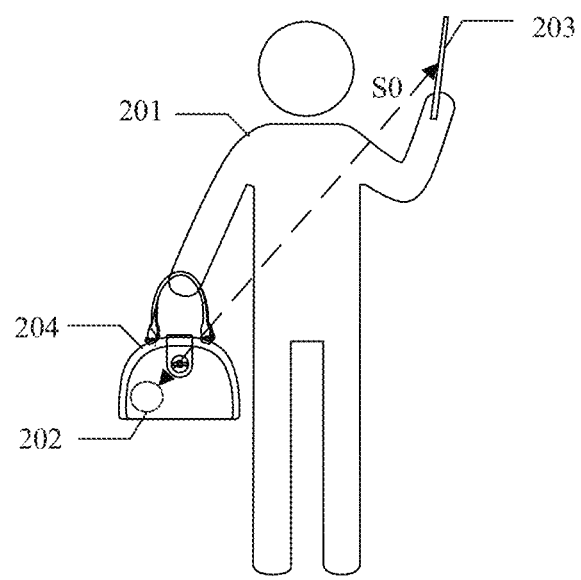
FIG. 2a is a schematic diagram of an application scenario of a Bluetooth positioning device disclosed in an embodiment of this application.

FIG. 2a is an example of an application scenario of a Bluetooth positioning device. A user 201 may place a Bluetooth positioning device 202 in a handbag 204, and the Bluetooth positioning device is bound to a mobile phone 203. When the Bluetooth positioning device 202 is within a Bluetooth communication range of the mobile phone 203, the Bluetooth positioning device 202 establishes a Bluetooth connection to the mobile phone 203, and relative positions of the Bluetooth positioning device 202 and the mobile phone 203 may be displayed on the mobile phone 203, thereby helping the user find the Bluetooth positioning device and the handbag placed together. When the Bluetooth positioning device 202 is outside the Bluetooth communication range of the mobile phone 203, the mobile phone 203 may obtain location information of the Bluetooth positioning device 202 by using another electronic device, thereby helping the user find the Bluetooth positioning device and the handbag placed together.

An identity of the Bluetooth positioning device may be a physical address (Media Access Control Address, MAC address) of the Bluetooth positioning device, or a group of keys that are scrolled and updated periodically. For example, the key may be a public key, that is, a publickey. According to a Bluetooth communication protocol, a physical address of a same Bluetooth positioning device is updated periodically. For example, the physical address may be updated every four minutes.

This type of Bluetooth positioning device has a serious security risk, that is, a user may use this type of Bluetooth positioning device to track another user. For example, a user A places a Bluetooth positioning device (or another Bluetooth positioning device with a similar function) of the user A in a specific item of a user B, such as a vehicle or a clothing pocket, and the user B carries the Bluetooth positioning device to move without knowing it. In this way, the user A obtains location information of the Bluetooth positioning device by using the foregoing mechanism, so as to track the user B. The method provided in this application aims to prevent an electronic device of a user from being tracked by another Bluetooth positioning device with a similar function of another user.

Figure 2B:
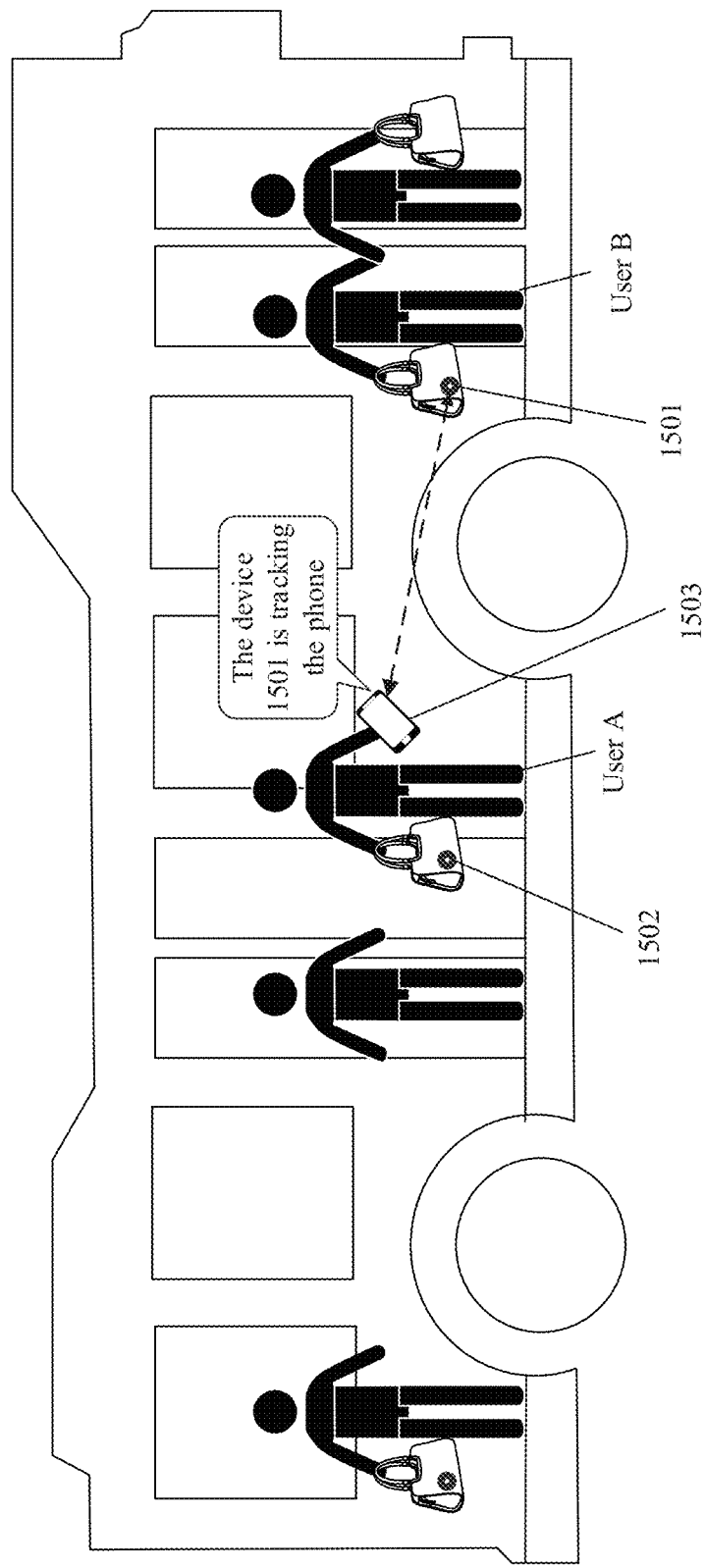
FIG. 2b is a schematic diagram of an application scenario of another Bluetooth positioning device disclosed in an embodiment of this application.
Figure 2C:
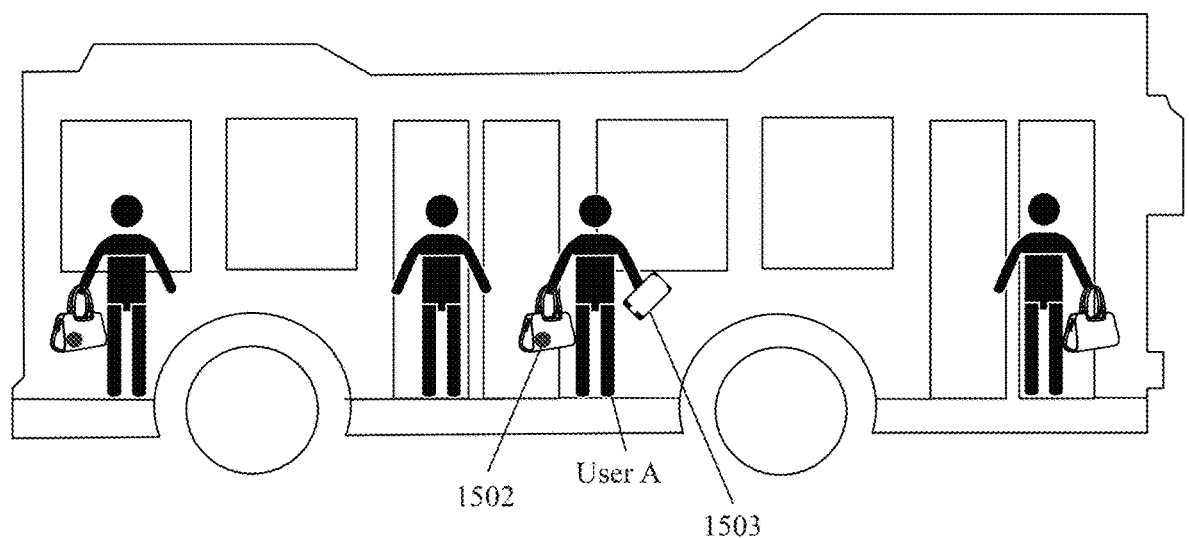
FIG. 2c is a schematic diagram of an application scenario of still another Bluetooth positioning device disclosed in an embodiment of this application.

FIG. 2b and FIG. 2c are schematic diagrams of an application scenario in which the Bluetooth positioning device is used to track. As shown in FIG. 2b, when the user A travels by bus, a Bluetooth positioning device 1501 carried by the user B on a same bus with the user A periodically feeds back location information of the Bluetooth positioning device 1501 to a mobile phone bound to the Bluetooth positioning device 1501 based on the foregoing working principle. Therefore, the Bluetooth positioning device 1501 may track the user A and obtain a moving track of the user A within a period of time. After the bus travels a specific distance, as shown in FIG. 2c, the user B gets off the bus, and the Bluetooth positioning device 1501 is far away from the user A and stops tracking the user A correspondingly.

For example, the Bluetooth positioning device in the embodiments of this application may be specifically a product named AirTag® launched by Apple, or may be another Bluetooth positioning device with a similar function developed based on an Android system. An identification signal may have a plurality of forms and names. For example, the identification signal may be referred to as a Findmy signal.

For a security risk existing in the foregoing Bluetooth positioning device, the embodiments of this application provides a Bluetooth positioning device detection method and an electronic device with a tracking detection function. For example, the tracking detection function is provided by an anti-tracking application configured on the electronic device. The anti-tracking application may be an application (Applications, App) visible to a user on the electronic device, or may be a specific component generally invisible to the user. After a processor of the electronic device runs the foregoing anti-tracking application, the electronic device may execute the Bluetooth positioning device detection method provided in this application. In a process of performing the detection method, the electronic device can record its own location information, thereby forming a moving track of the electronic device, that is, an electronic device track. Location information recorded by the electronic device when the Bluetooth positioning device is detected may be considered as a Bluetooth positioning device track. By comparing a similarity between the electronic device track and the positioning device track, whether the electronic device is tracked by a nearby Bluetooth positioning device can be detected. An electronic device track is a moving track of an electronic device with a tracking detection function. A positioning device track is a set of location information recorded when the electronic device detects a signal of a Bluetooth positioning device. The location information can reflect a location of a Bluetooth positioning device located near the electronic device. Therefore, the set of location information recorded when the electronic device detects the signal of the Bluetooth positioning device may be considered as a moving track of the Bluetooth positioning device, that is, the positioning device track. The anti-tracking application may be downloaded and installed on the electronic device by the user, or may be pre-installed on the electronic device by a manufacturer when the electronic device is released.

In some embodiments, the foregoing electronic device may include a mobile terminal. The electronic device track may also be referred to as a mobile terminal track.

The following uses the electronic device shown in FIG. 1 as an example to describe the Bluetooth positioning device detection method provided in the embodiments of this application.

Figure 3:
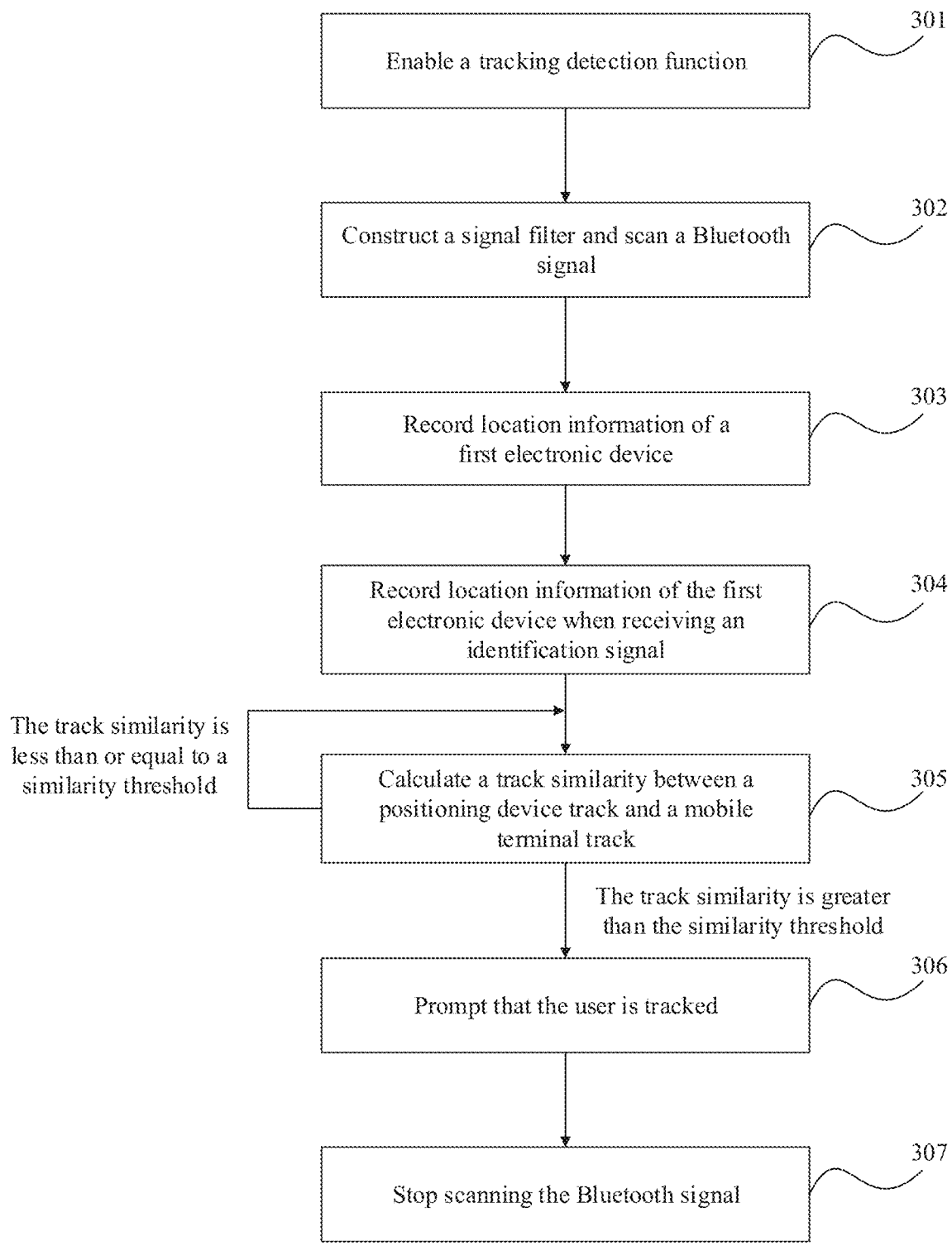
FIG. 3 is a flowchart of a Bluetooth positioning device detection method disclosed in an embodiment of this application.

Referring to FIG. 3, the Bluetooth positioning device detection method provided in the embodiments of this application may be performed by a first electronic device. The first electronic device is an electronic device configured with a tracking detection function. The Bluetooth positioning device detection method provided in the embodiments of this application may specifically include the following steps:

301: Enable a tracking detection function.

In some embodiments, in step 301, after detecting that an enabling condition is met, the first electronic device enables the tracking detection function. In some other embodiments, the first electronic device may directly enable the tracking detection function after being powered on. This embodiment of this application sets no limitation on how the first electronic device enables the tracking detection function.

It may be understood that there may be a plurality of enabling conditions. For example, the first electronic device may enable the tracking detection function after receiving an operation in which the user actively enables the tracking detection function, or may enable the tracking detection function after detecting that the user lights up a screen.

In some embodiments, the user may further set an enabling condition on a user interface.

In some possible embodiments, the method provided in the embodiments of this application may be implemented by an anti-tracking application installed on the first electronic device. In this case, the user may set an enabling condition on user interfaces shown in FIG. 4a and FIG. 4b.

Figure 4A:
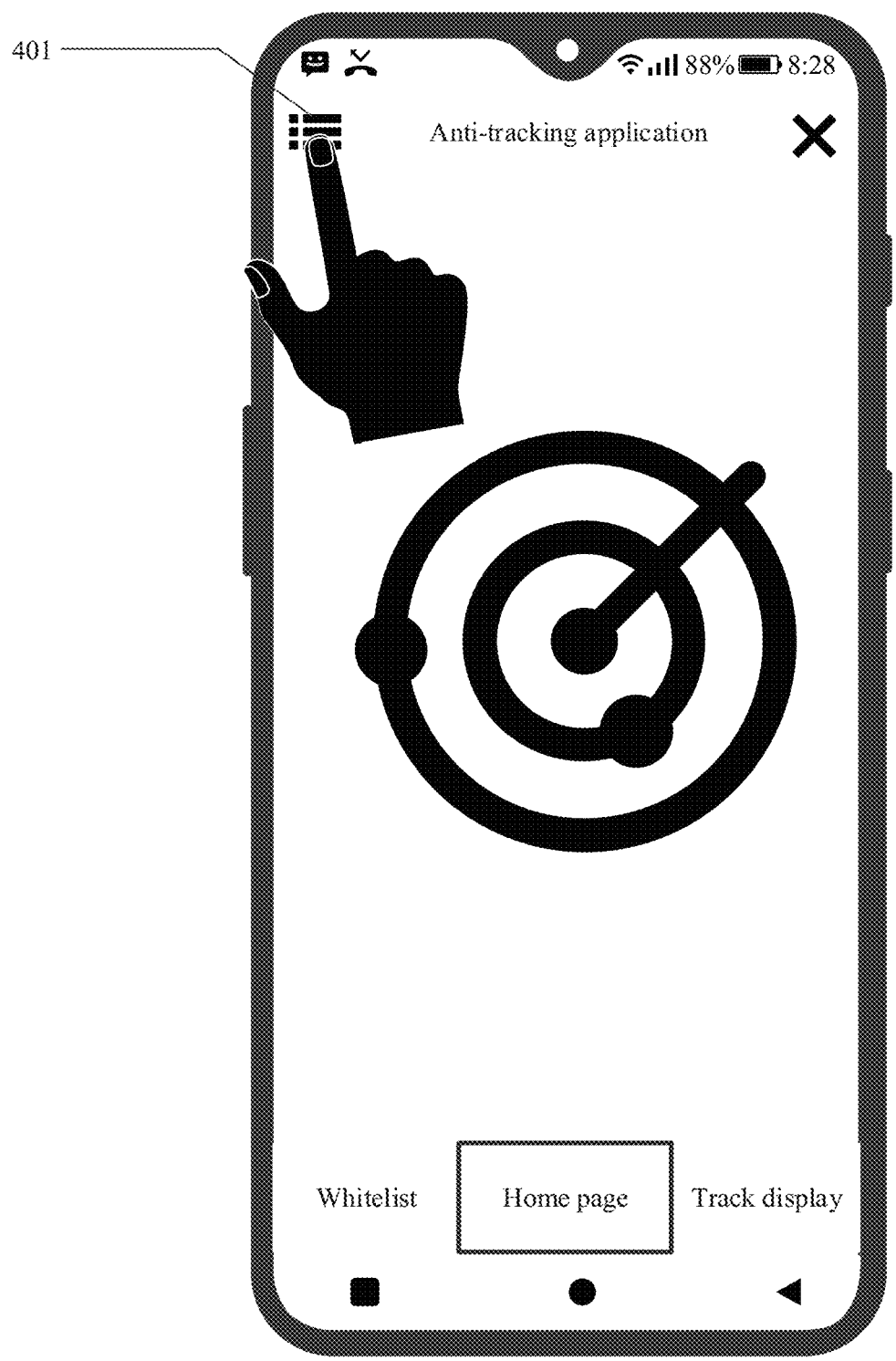
FIG. 4a is a schematic diagram of a user interface of an anti-tracking application disclosed in an embodiment of this application.

FIG. 4a is a schematic diagram of a user interface of an anti-tracking application according to an embodiment of this application. After the user taps an icon of the anti-tracking application on a desktop of the electronic device, the anti-tracking application is enabled and presents the user interface shown in FIG. 4a on a screen of the electronic device. After the anti-tracking application is started, the Bluetooth positioning device detection method provided in this embodiment is automatically executed. After the anti-tracking application presents the interface shown in FIG. 4a, the user may tap a menu button 401 shown in FIG. 4a, and the anti-tracking application presents a user interface shown in FIG. 4b in response to the tap of the user on 401.

Figure 4B:
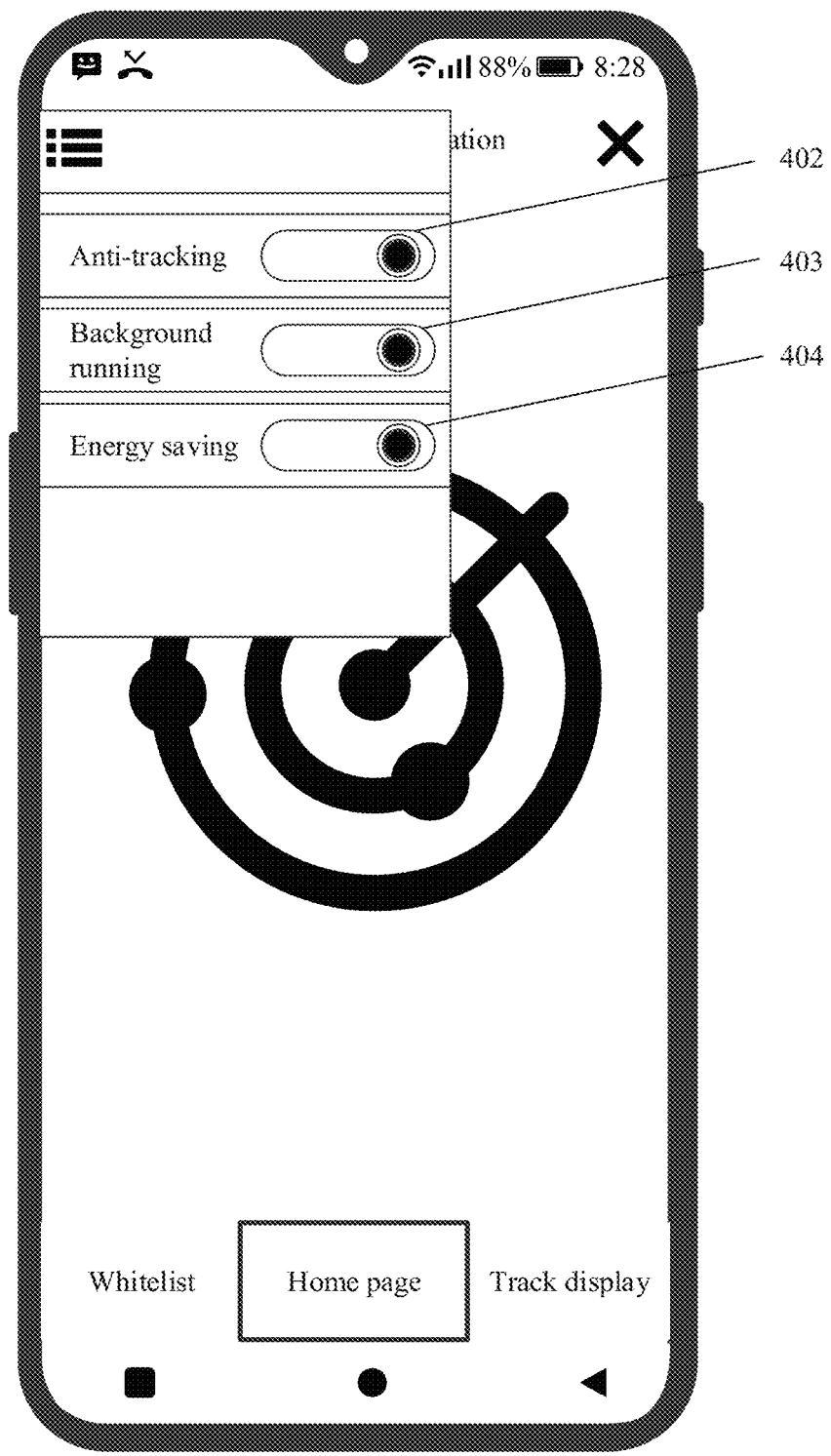
FIG. 4b is a schematic diagram of a user interface of another anti-tracking application disclosed in an embodiment of this application.

The user interface shown in FIG. 4b may display at least an anti-tracking control 402, a background running control 403, and an energy saving running control 404. Circular controls in 402 to 404 may be moved to a left or right side of a corresponding control based on a tap of the user, and the anti-tracking application performs a corresponding action based on positions of the circular controls. A position of the circular control in 402 is used to enable or disable the anti-tracking application to perform the Bluetooth positioning device detection method provided in this embodiment. The circular control in 402 is located on the left side to indicate prohibition, and located on the right side to indicate permission. A position of the circular control in 403 is used to enable or disable the anti-tracking application to run in the background. When the background running control is set to "Yes", the anti-tracking application continues to run in the background after the user taps an exit button to exit the anti-tracking application, so as to execute the Bluetooth positioning device detection method provided in this embodiment. When the background control is set to "No", the anti-tracking application stops running after the user taps the exit button. The circular control in 403 is located on the left side to indicate "No", and located on the right side to indicate "Yes". When the anti-tracking application is allowed to run in the background, the energy saving running control 404 is configured to control running time of the anti-tracking application in the background. If the energy saving running control is set to "No", the anti-tracking application runs in the background when the electronic device is in a wake-up state or a sleep state. If the energy saving running control is set to "Yes", the anti-tracking application runs in the background only when the electronic device is in the wake-up state (that is, the screen is on), and the anti-tracking application stops running in the background when the electronic device is in the sleep state. The circular control in 404 is located on the left side to indicate "No", and located on the right side to indicate "Yes".

In the foregoing user interface, when the anti-tracking control 402 is set to "Yes" and the background running control 403 is set to "No", in this case, the enabling condition is that receiving an operation in which the user actively enables the tracking detection function, and the first electronic device actively enables the tracking detection function in response to the operation in which the user enables the tracking detection function.

In the foregoing user interface, when the anti-tracking control 402 is set to "Yes", and the background running control 403 and the energy saving running control 404 are both set to "Yes", the enabling condition is detecting that the user lights up the screen In this case, when the first electronic device detects that the user lights up the screen, the first electronic device enables the tracking detection function.

Setting the enabling condition as the first electronic device receiving an operation of lighting up the screen by the user has the following advantages:

The tracking detection function can be restricted to run only when the electronic device is in the wake-up state, not when it is in the sleep state. In this way, energy consumption of the electronic device can be prevented from being greatly increased due to implementation of the detection method of this embodiment, thereby reducing energy consumption of the electronic device.

Figure 5A:
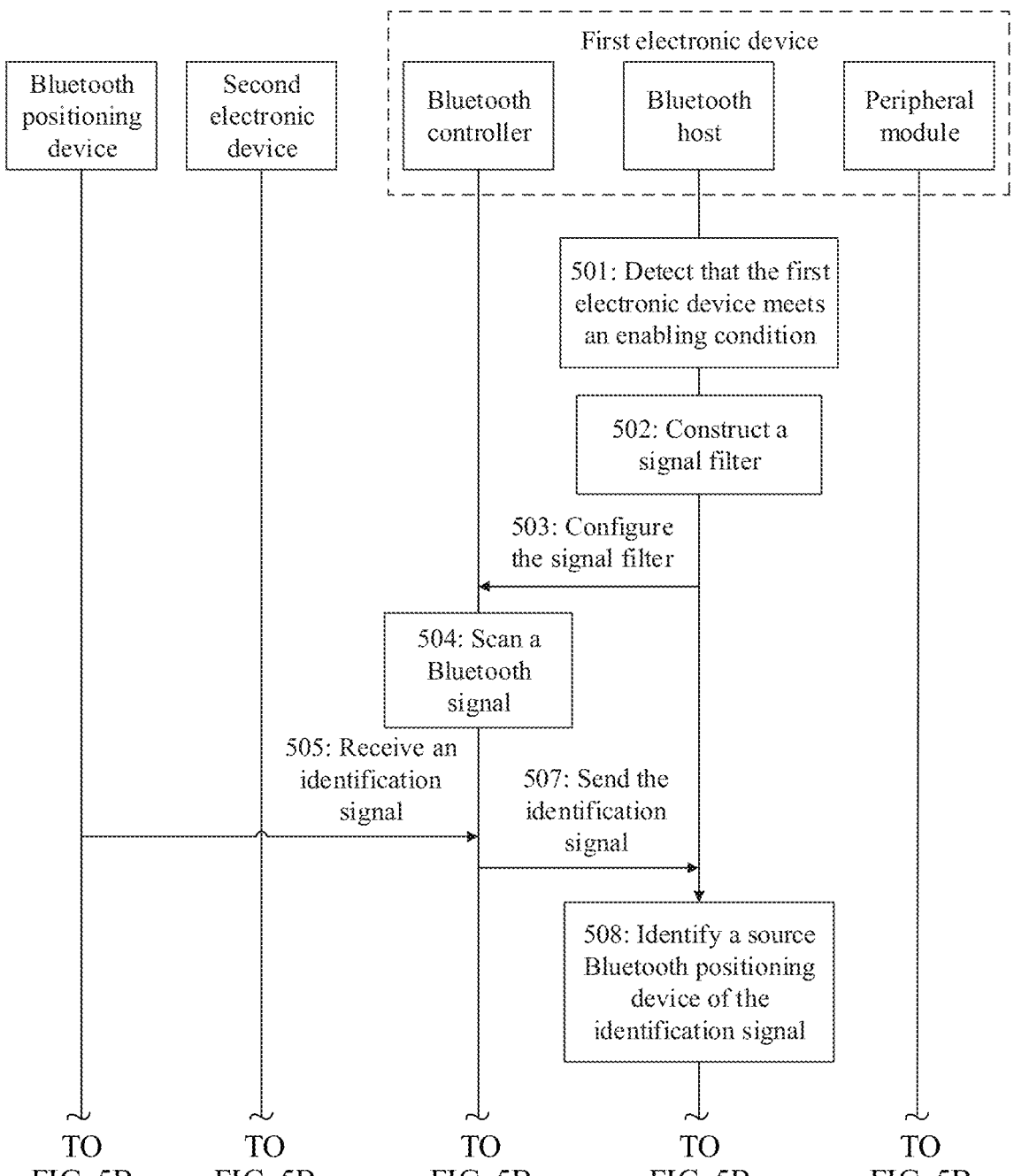
FIG. 5A and FIG. 5B are a schematic diagram of a device interaction process disclosed in an embodiment of this application.

In some possible embodiments, step 301 may include step 501 shown in FIG. 5A.

In some possible embodiments, step 301 may be specifically performed by the anti-tracking application installed on the first electronic device, or performed by a processor that is on the first electronic device and that is configured to run the anti-tracking application.

302: Construct a signal filter and scan a Bluetooth signal.

The method provided in this embodiment of this application needs to be implemented based on a specific Bluetooth signal received by the electronic device. Therefore, in step 302, the first electronic device needs to construct a corresponding signal filter for the specific Bluetooth signal, and then configures the signal filter to a Bluetooth controller (Bluetooth Controller), so that the Bluetooth controller starts to scan the Bluetooth signal, and identifies, by using the signal filter, the specific Bluetooth signal from a plurality of Bluetooth signals detected through scanning.

The foregoing specific Bluetooth signal may be specifically a Bluetooth signal sent by the Bluetooth positioning device. The first electronic device may determine whether there is a Bluetooth positioning device within a specific distance based on whether a specific Bluetooth signal is received.

The signal filter may be a preset data type used to filter a specific Bluetooth signal.

For example, the signal filter may be a signal filter provided by an Android system, or may be a signal filter provided by another operating system except the Android system. A form and a name of the signal filter are not limited in this embodiment of this application.

The first electronic device may construct the signal filter in the following manner:

When the first electronic device needs to obtain a specific type of Bluetooth signal, a filter constructor provided by an operating system of the first electronic device may be invoked and feature data of the specific type of Bluetooth signal is input into the filter constructor, so as to construct a signal filter for the specific type of Bluetooth signal.

When invoking a Bluetooth module for scanning, the first electronic device may add the constructed signal filter as an input parameter to a command for invoking the Bluetooth module for scanning, so as to configure the constructed signal filter to the Bluetooth module.

Each time a Bluetooth signal is detected by the Bluetooth module through scanning, the Bluetooth signal may be compared with each configured signal filter. If it is found that the Bluetooth signal carries feature information of a signal filter, the Bluetooth module may identify that the Bluetooth signal is a signal of a type corresponding to the signal filter.

Feature data of a specific type of Bluetooth signal refers to some data that this type of Bluetooth signal necessarily carries. For example, the feature data may include a Bluetooth device name, a Bluetooth device MAC address, service data, manufacturer data, and the like. It may be understood that the feature data may also include another type of data, which is not limited in this embodiment of this application. The service data is used to indicate a function of the Bluetooth signal, and the manufacturer data is used to indicate a manufacturer of a device that sends the Bluetooth signal.

In this embodiment, the first electronic device needs to acquire a specific Bluetooth signal to implement tracking detection. In some optional implementations, a specific Bluetooth signal may include a status signal and an identification signal. The identification signal is periodically broadcast by the foregoing Bluetooth positioning device to a surrounding device. It may be understood that when the first electronic device needs to detect another Bluetooth device, the specific Bluetooth signal may also include a signal sent by the another Bluetooth device. A composition of the specific Bluetooth signal is not limited in this embodiment of this application.

The status signal, which may also be referred to as a Bluetooth status signal, is a signal that is broadcast by an electronic device to a surrounding device in real time periodically after the Bluetooth module is enabled, and the status signal is used to announce a status of the electronic device that sends the status signal to the surrounding device.

The identification signal may also be referred to as a Bluetooth identification signal, or a signal sent by the Bluetooth positioning device to a surrounding device, and the identification signal carries an identity of the Bluetooth positioning device that sends the identification signal. After receiving the identification signal, the electronic device may identify the Bluetooth positioning device that sends the identification signal based on the identification signal.

The first electronic device obtains two types of signals: a status signal and an identification signal. Correspondingly, the signal filter constructed by the first electronic device includes a status signal filter and an identification signal filter.

A Bluetooth positioning device is used as an example. When the first electronic device needs to detect whether the first electronic device is tracked by the Bluetooth positioning device, an identification signal filter that is used to filter an identification signal sent by the Bluetooth positioning device needs to be constructed.

In some optional embodiments, when detecting whether the first electronic device is tracked, a status signal filter that is used to filter a status signal needs to be constructed. It may be understood that, in some embodiments, the first electronic device may also implement the method provided in the embodiments of this application without constructing a status signal filter.

A construction manner of the status signal filter is as follows:

The first electronic device obtains the service data of the status signal and corresponding manufacturer data (manufacturer ID), and then the service data of the status signal and the manufacturer data are input into the filter constructor as input parameters to obtain the status signal filter constructed by using the filter constructor.

A construction manner of the identification signal filter is as follows:

The first electronic device obtains the service data of the status signal and corresponding manufacturer data (manufacturer ID), and then the service data of the status signal and the manufacturer data are input into the filter constructor as input parameters to obtain the status signal filter constructed by using the filter constructor.

The service data and the corresponding manufacturer data of the status signal, the service data and the corresponding manufacturer data of the identification signal, may be pre-stored in the first electronic device, or may be downloaded from the network when required by the first electronic device.

The filter constructor in the foregoing construction manner may be an original filter constructor in the operating system, or may be another filter constructor that is set in the operating system by a manufacturer of the electronic device.

After the status signal filter and the identification signal filter are configured for the Bluetooth module, each time the Bluetooth module detects a Bluetooth signal through scanning, the Bluetooth signal may be sequentially compared with data of the status signal filter and the identification signal filter. After comparison, if a Bluetooth signal carries service data and manufacturer data in a status signal filter, the Bluetooth module determines that the Bluetooth signal is a status signal; or if a Bluetooth signal carries service data and manufacturer data in an identification signal filter, the Bluetooth module determines that the Bluetooth signal is an identification signal.

For example, the status signal may be a nearby signal, the status signal filter may be a nearby filter, the identification signal may be a Findmy signal, and the identification signal filter may be a Findmy filter.

The nearby signal is a status signal that is broadcast in real time to a surrounding device by various electronic devices (abbreviated as Apple device, Appledevice) launched by Apple Corporation. The nearby signal is used to indicate a status of a transmit end (that is, a device that sends the nearby signal) to a receive end (that is, a device that receives the nearby signal), such as battery power and whether a Bluetooth function is available.

In a specific example, service data of the nearby signal may be 0x10 or 0x07, and service data of the Findmy filter may be 0x12 or 0x19.

In some optional embodiments, the first electronic device may automatically enable a tracking detection function without requiring a user setting. In some embodiments, a program that provides a tracking detection function may run in the background of the electronic device in real time after the electronic device is powered on, without detecting that the electronic device meets an enabling condition.

In some embodiments, the foregoing signal filters may be preconfigured in the Bluetooth module, and therefore do not need to be constructed in step 302.

After the signal filter is constructed, the first electronic device may configure the signal filter to the Bluetooth controller of the Bluetooth module. After obtaining the signal filter, the Bluetooth module scans the Bluetooth signal, and identifies, by using the signal filter, a specific Bluetooth signal through filtering from a large quantity of Bluetooth signals detected through scanning. For example, the Bluetooth module identifies, by using the identification signal filter, an identification signal through filtering from the large quantity of Bluetooth signals detected through scanning, and identifies, by using the status signal filter, a status signal through filtering from the large quantity of Bluetooth signals detected through scanning.

In some optional embodiments, considering that the Bluetooth module of the first electronic device may not be enabled after the signal filter is constructed, the first electronic device may determine whether the Bluetooth module of the first electronic device is enabled before configuring the signal filter for the Bluetooth controller. If the Bluetooth module of the first electronic device is enabled, the first electronic device directly configures the constructed signal filter to the Bluetooth controller of the Bluetooth module.

If the Bluetooth module of the first electronic device is not enabled after the signal filter is constructed, the first electronic device displays an enabling Bluetooth prompt on a display to prompt the user to enable the Bluetooth module, and then configures the constructed signal filter to the Bluetooth controller after the user enables the Bluetooth module.

If the Bluetooth module of the electronic device is not enabled after the signal filter is constructed, the first electronic device enables the Bluetooth module, disables the Bluetooth module after the Bluetooth module performs scanning for a specific time, enables the Bluetooth module again after a preset scanning period and uses the Bluetooth module to perform scanning for a specific time, and so on. In the foregoing manner of scanning the Bluetooth signal, on the premise of not missing the identification signal broadcasted by the Bluetooth positioning device, working time of the Bluetooth module is reduced, thereby reducing energy consumption of the electronic device. For example, the scanning period may be set to 4 seconds.

For example, an interval at which the Bluetooth positioning device sends the identification signal is generally 6 seconds. After the first electronic device starts to run, the bluetooth module is enabled first, and after obtaining an identification signal by using the Bluetooth module, the bluetooth module is disabled. After four seconds, the first electronic device enables the Bluetooth module again, and then disables the Bluetooth module after obtaining a next identification signal, and so on.

In some optional embodiments, each time a status signal is detected through scanning, the Bluetooth controller may report the status signal to a processor of the first electronic device. Alternatively, the Bluetooth controller may report status signals in a batch reporting manner. After detecting a batch of status signals through scanning, the Bluetooth controller reports the batch of status signals to the first electronic device. A batch of status signals refers to a preset quantity of status signals, for example, 20 status signals. For example, the Bluetooth controller may also report the status signal to the processor of the first electronic device.

In some possible embodiments, step 302 may be performed by the Bluetooth module of the first electronic device. Further, referring to steps 502 to 504 shown in FIG. 5A, scanning the Bluetooth signal may be performed by the Bluetooth controller controlling the Bluetooth module.

303: Record location information of the first electronic device.

In step 303, the first electronic device may continuously record its own location information after being powered on.

Further, in some optional embodiments, the first electronic device may periodically record its own location information, or may continue to record its own location information after an identification signal or a status signal is detected. This is not limited in this embodiment of this application.

A plurality of pieces of location information recorded in step 303 constitute a moving track of the first electronic device (also referred to as a mobile terminal track). Therefore, step 303 is equivalent to recording the mobile terminal track after receiving the status signal.

In some embodiments, the electronic device track or the mobile terminal track may be referred to as a first track.

In some embodiments, the location information recorded by the first electronic device in step 303 may be considered as first location information.

Step 303 includes that the first electronic device obtains its own current location information, and that the first electronic device stores the obtained location information. The plurality of pieces of location information stored by executing step 303 constitute a moving track of the first electronic device.

Current location information of the first electronic device may include a base station identifier (also referred to as a cell identifier, cell ID), a network identifier (Wifi ID) of a wireless local area network, and a current geographic coordinate of the electronic device (that is, a latitude and longitude of a current location of the electronic device).

In some possible embodiments, the first electronic device may obtain its own location information in a plurality of manners.

For example, the first electronic device may obtain the location information of the electronic device in the following several manners.

1. The first electronic device may actively search for a base station, and record a base station identifier of a found base station as location information of the first electronic device.

In some possible embodiments, the first electronic device may have searched for a plurality of base stations and obtain a plurality of base station identifiers correspondingly, for example, the first electronic device obtains cell ID1, 2, 3. When a plurality of base stations are found, the first electronic device may select a base station identifier of a base station with the strongest signal strength as location information, or may determine all base station identifiers of the plurality of found base stations as location information. A quantity and a form of the recorded base station identifier are not limited in this embodiment of this application.

For example, the first electronic device may actively search for a base station by using the mobile communication module shown in FIG. 1.

2. The first electronic device may read a base station identifier of a base station currently accessed by the first electronic device as location information.

For example, the first electronic device may read, by using an interception interface (phonelistener) of the mobile communication module shown in FIG. 1, the base station identifier of the base station currently accessed by the first electronic device.

An advantage of obtaining the base station identifier in the second manner lies in avoiding frequently searching for the base station, thereby reducing energy consumption of the first electronic device.

3. The first electronic device searches for a wireless local area network (Wifi) and records a network identifier (Wifi ID) of a found wireless local area network, and determines the found network identifier as current location information of the electronic device. If a plurality of wireless local area networks are found, the first electronic device may select a network identifier with strongest signal strength as current location information of the first electronic device, or may determine all the plurality of found network identifiers as location information of the first electronic device. A quantity and a form of the recorded base station identifier are not limited in this embodiment of this application.

For example, the first electronic device may invoke the wireless communication module shown in FIG. 1 to search for a wireless local area network.

4. The first electronic device reads a network identifier of a wireless local area network currently accessed by the electronic device, and determines the read network identifier as current location information of the electronic device.

For example, the first electronic device may read, from the wireless communications module shown in FIG. 1, the network identifier of the wireless local area network currently accessed by the electronic device.

5. The first electronic device reads a current geographical coordinate of the first electronic device, and then uses the read geographical coordinate as location information of the first electronic device for the first electronic device.

For example, the first electronic device may read the current geographical coordinate of the first electronic device from a satellite positioning module included in the wireless communication module shown in FIG. 1.

In some possible embodiments, the first electronic device may obtain the location information in the foregoing several manners.

For example, when the first electronic device receives a signal of the wireless local area network, the first electronic device may obtain the network identifier of the wireless local area network as the location information. When the first electronic device receives a signal of a cellular communication and does not receive the signal of the wireless local area network for a period of time, the first electronic device may obtain the base station identifier as the location information. When the first electronic device does not receive the signal of the wireless local area network and the signal of the cellular communication for a period of time, the first electronic device may obtain the geographical coordinate as location information. A form of the location information and a manner of obtaining the location information are not limited in this embodiment of this application.

In some possible embodiments, the first electronic device may store location information in a plurality of forms. A storage form of the location information is not limited in this embodiment of this application.

For example, the first electronic device may store the location information in a list. When the first electronic device stores the location information by using the list, the first electronic device creates, in advance, a list used to store the mobile terminal track, and each time the first electronic device records the location information, the location information may be stored in the foregoing list used to store the mobile terminal track.

Further, because a form of the location information includes the base station identifier, the network identifier, and the geographical coordinate, the list used to store the mobile terminal track may specifically include a base station list, a network list, and a coordinate list. The list used to store the mobile terminal track may include the base station list, the network list, and the coordinate list. When storing the location information, if the location information is a base station identifier, the first electronic device stores the location information in the base station list; if the location information is a network identifier, the first electronic device stores the location information in the network list; or if the location information is a geographical coordinate, the first electronic device stores the location information in the coordinate list.

In step 303, the first electronic device may record its own location information, so as to obtain a moving track of the first electronic device composed of a plurality of pieces of location information. In some optional embodiments, after receiving the status signal, the first electronic device may start to periodically record the location information of the first electronic device periodically, for example, periodically record location information of the first electronic device. In some other optional embodiments, the first electronic device may record location information of the first electronic device every time a status signal is received. A specific implementation of a specific step 303 is not limited in this embodiment of this application.

Recording the location information of the first electronic device continuously after the status signal is received has the following functions:

When the first electronic device does not receive the status signal, it may be considered that there is no another electronic device around the electronic device within a specific distance (an effective distance of a Bluetooth signal may be 10 to 50 meters). In this case, even if a user of the first electronic device carries one or more Bluetooth positioning devices of another user, location information of the Bluetooth positioning devices cannot be sent to an electronic device of the another user in time by using the surrounding electronic device, and the location information of the user of the first electronic device is not leaked to the another user. Therefore, the first electronic device does not need to continuously record location information of the first electronic device, so that energy consumption of the first electronic device can be reduced.

It should be noted that the receiving the status signal in step 303 is a manner of recording the location information of the first electronic device according to this embodiment. In some optional embodiments, the first electronic device may record the location information of the first electronic device in another recording manner. A specific recording manner is not limited in this embodiment of this application.

It should be noted that the receiving the status signal in step 303 is a manner of recording the location information of the first electronic device according to this embodiment. In some optional embodiments, the first electronic device may record the location information of the first electronic device in another recording manner. A specific recording manner is not limited in this embodiment of this application.

For example, the first electronic device may further record location information based on the following recording manners.

Recording manner 1: The first electronic device periodically records current location information.

For example, the first electronic device may record the current location information of the first electronic device every 6 seconds. A plurality of periodically recorded pieces of location information constitute a mobile terminal track corresponding to the first electronic device.

Recording manner 2: When the first electronic device detects a handover event of accessing the base station, the first electronic device records current location information once.

For example, the first electronic device listens to the handover event of the accessing the base station by using an interception interface phonelistener.

If the first electronic device records the location information of the electronic device based on the foregoing manner 1 or manner 2, the first electronic device may not construct a signal filter for filtering a status signal in the Bluetooth scanning part. Correspondingly, the Bluetooth module of the electronic device only needs to report the identification signal to the first electronic device when receiving the identification signal.

In some optional embodiments, when storing the location information, the first electronic device may combine repeated location information in the following manner:

Before storing one piece of location information, the first electronic device determines whether location information stored last time is the same as the location information to be stored this time (denoted as current location information). If the location information stored last time is the same as the current location information, the first electronic device skips storing the current location information. In this case, the obtained current location information may be deleted. If the location information stored last time is different from the current location information, the first electronic device stores the current location information.

In some optional embodiments, when a user uses a navigation application of the electronic device to navigate, the first electronic device may record location information on a navigation path in the memory. For example, a base station identifier of each base station through which the navigation path passes is recorded, and geographical coordinates of several points on the navigation path are recorded. When the user uses the navigation application again and passes through a same navigation path, the first electronic device does not need to obtain the location information of the electronic device by using a mobile communication module, a wireless communication module, or a satellite positioning module of the electronic device, but directly reads and stores the location information recorded when passing the navigation path last time from the memory, so as to reduce power consumption of the first electronic device.

A path 1 is used as an example. When the user navigates through the path 1 for the first time, the first electronic device records, in the memory, a base station identifier of each base station through which the path 1 passes. When the user navigates through the path 1 again, if the first electronic device obtains a status signal in a navigation process, the first electronic device directly reads, from the memory, a base station identifier corresponding to a current location, and stores the read base station identifier as the current location information of the electronic device.

Figure 5B:
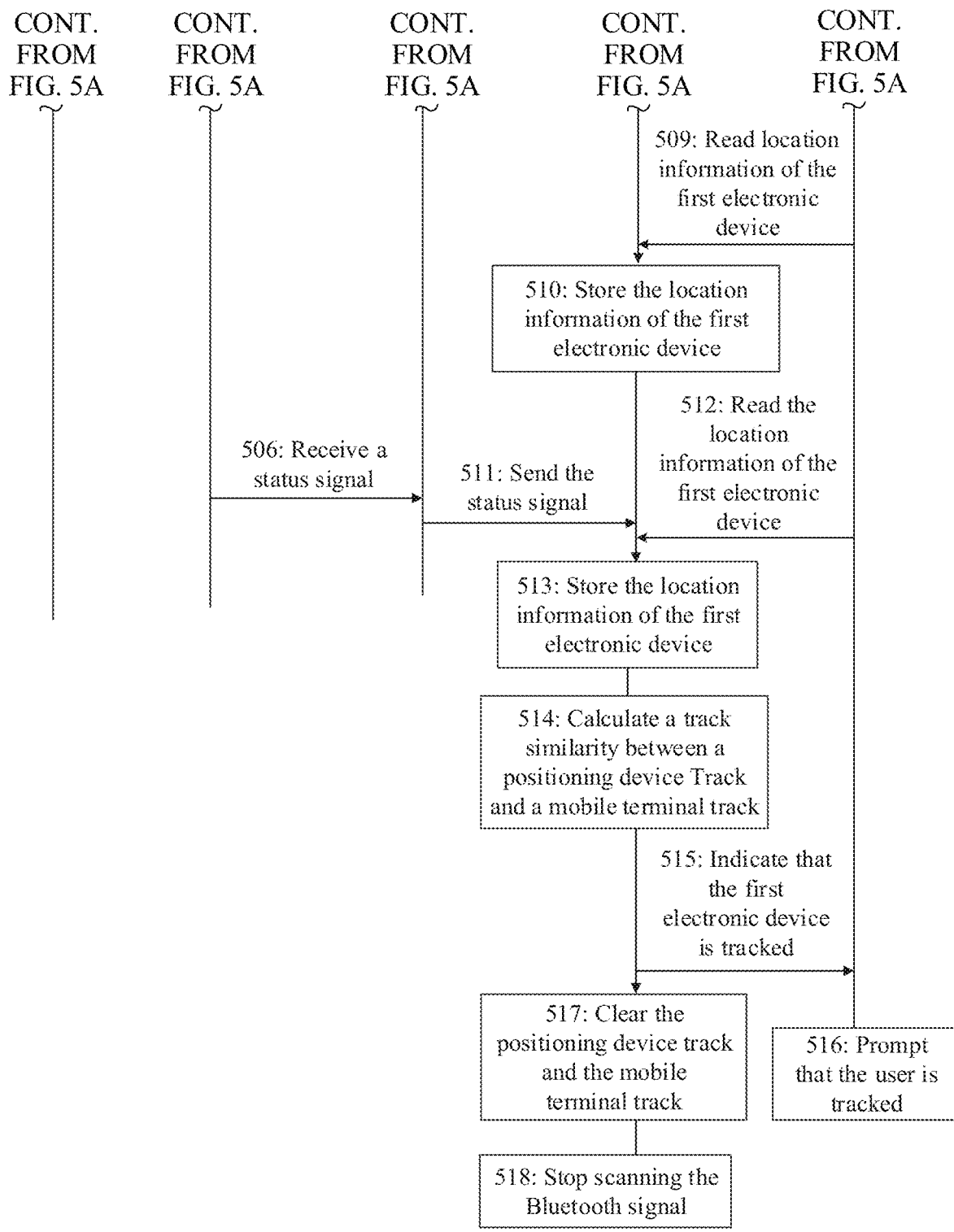

Referring to a device interaction process shown in FIG. 5A and FIG. 5B, in some possible embodiments, step 303 may include step 506, step 511, step 512, and step 513 shown in FIG. 5A and FIG. 5B.

In some possible embodiments, step 303 may be specifically performed by the anti-tracking application installed on the first electronic device. When performed by the anti-tracking application, a specific execution process of step 303 may refer to the embodiment corresponding to FIG. 6.

304: Record the location information of the first electronic device when an identification signal is received.

A plurality of pieces of location information recorded in step 304 constitute a moving track of the Bluetooth positioning device (also referred to as a positioning device track). Therefore, step 304 is equivalent to recording the positioning device track when the identification signal is received. When the first electronic device receives the identification signal, the Bluetooth positioning device is located near the first electronic device. The location information recorded when the first electronic device receives the identification signal is equivalent to the location information of the Bluetooth positioning device. Correspondingly, the location information recorded when a plurality of first electronic devices receive the identification signal may reflect a moving track of the Bluetooth positioning device. Therefore, in this embodiment, the positioning device track refers to a set of location information that is of the first electronic device and that is recorded when the first electronic device receives the identification signal.

In some embodiments, the positioning device track may also be referred to as a second track. The location information recorded by the first electronic device in step 304 may be considered as second location information, or may be considered as first location information.

Step 304 includes that the first electronic device identifies a source Bluetooth positioning device of the identification signal, obtains location information of the first electronic device when the identification signal is received, and then stores the location information of the first electronic device. The plurality of pieces of location information stored by the first electronic device in response to receiving the identification signal constitute a positioning device track. For a manner of obtaining the location information of the first electronic device, refer to step 303. Details are not described again.

An execution sequence of identifying a source Bluetooth positioning device and obtaining location information is not limited in this embodiment of this application. The first electronic device may first identify the source Bluetooth positioning device and then obtain the location information, or may first obtain the location information and then identify the source Bluetooth positioning device.

In some optional embodiments, the first electronic device receives identification signals of a plurality of Bluetooth positioning devices. Therefore, the first electronic device may distinguish these identification signals from different Bluetooth positioning devices by identifying a source Bluetooth positioning device of each identification signal. FIG. 2b is used as an example. When performing the method provided in this embodiment of this application, a first electronic device 1503 held by a user A may receive identification signals from a Bluetooth positioning device 1501 and a Bluetooth positioning device 1502. Therefore, the first electronic device needs to distinguish the identification signals from the two Bluetooth positioning devices.

In some optional embodiments, the first electronic device may identify the source Bluetooth positioning device of the identification signal in a plurality of manners. A specific identification method is not limited in this embodiment of this application. For example, the first electronic device may identify the source Bluetooth positioning device of the identification signal in a manner of merging the identification signals.

In some optional embodiments, the plurality of pieces of location information recorded by the first electronic device in step 304 may be used as the positioning device track, or may be used as a part of the mobile terminal track. That is, the positioning device track obtained by the first electronic device may include the location information recorded in step 304. The mobile terminal track obtained by the first electronic device may include the location information recorded in step 303 and step 304.

For example, the first electronic device may separately store the positioning device track and the mobile terminal track in different lists. The location information recorded by the first electronic device in step 303 may be stored in a list used to store the mobile terminal track. The location information recorded by the first electronic device in step 304 may be separately stored in a list used to store the mobile terminal track and a list used to store the positioning device track.

Figure 16:
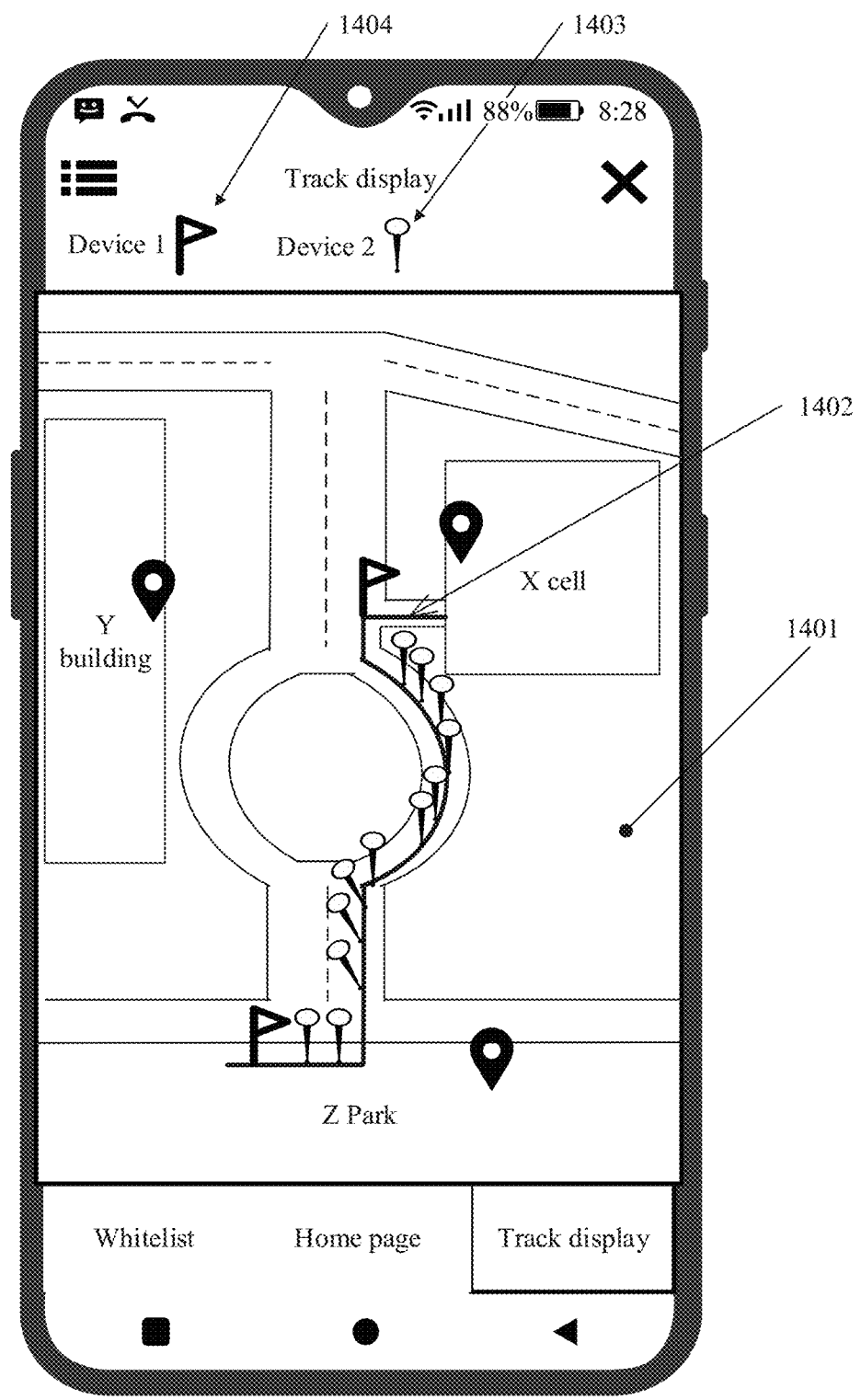
FIG. 16 is a schematic diagram of a display interface of a moving track disclosed in an embodiment of this application.

Referring to FIG. 16, location information marked on a map by an identifier 1404 is location information when the first electronic device receives an identification signal of a device 1, and location information marked on the map by an identifier 1403 is location information when the first electronic device receives an identification signal of a device 2. Several pieces of location information indicated by the identifier 1404 constitute a positioning device track corresponding to the device 1, and several pieces of location information indicated by the identifier 1403 constitute a positioning device track corresponding to the device 2. The location information indicated by the identifier 1403, the location information indicated by the identifier 1404, and the location information recorded when the first electronic device does not receive the identification signal (that is, the location information recorded in step 303) constitute a moving track 1402 of the first electronic device.

The source Bluetooth positioning device of the identification signal refers to the Bluetooth positioning device that sends the identification signal. In an example, it is assumed that the first electronic device obtains an identification signal B broadcast by a Bluetooth positioning device A, and the Bluetooth positioning device A is a source Bluetooth positioning device of the identification signal B.

After each time receiving an identification signal, the first electronic device may identify, by identifying the source Bluetooth positioning device of the identification signal, that the source Bluetooth positioning device of the identification signal is the same as which source Bluetooth positioning device of the identification signal previously received by the first electronic device. If the source Bluetooth positioning device of the identification signal is different from the source Bluetooth positioning device of all the identification signals previously received by the first electronic device, the first electronic device determines that the first electronic device receives an identification signal of a new Bluetooth positioning device.

After obtaining an identification signal, the first electronic device identifies a source Bluetooth positioning device of the identifier signal based on an identity carried by the identification signal and received signal strength indicator (Received Signal Strength Indication, RSSI) data of the identification signal.

The identity carried by the identification signal may be a MAC address of the source Bluetooth positioning device of the identification signal, or may be a key (for example, the foregoing publickey) of the source Bluetooth positioning device of the identification signal.

Therefore, after the first electronic device obtains an identification signal, if an identity carried by the identification signal is the same as an identity carried by an identification signal previously obtained by the first electronic device, the first electronic device may determine that the identity signal currently obtained and the previously obtained identity signal that carries the same identity are sent by a same Bluetooth positioning device.

An identity of a Bluetooth positioning device may change with time. For example, a Bluetooth positioning device may change its MAC address every 20 minutes, and update its publickey every other day. In this case, the first electronic device may identify, based on RSSI data of the obtained identification signal, whether identification signals that carry different identities are from a same Bluetooth positioning device. A process of identifying whether identification signals that carry different identities are from a same Bluetooth positioning device is referred to as identification signal merging.

RSSI data (including a Bluetooth signal) of a radio signal is used to indicate strength of the radio signal received by the electronic device. The RSSI of the radio signal is related to a transmission distance of the radio signal. If the electronic device is tracked by a Bluetooth positioning device, a distance between the electronic device and the Bluetooth positioning device that tracks the electronic device is generally relatively fixed. Therefore, a difference between RSSI data of a plurality of identification signals sent by the Bluetooth positioning device that tracks the electronic device to the electronic device is relatively small.

The first electronic device may receive identification signals from a plurality of Bluetooth positioning devices. Therefore, in step 304, when recording the positioning device track, the first electronic device needs to distinguish positioning device tracks corresponding to different Bluetooth positioning devices.

In some possible embodiments, to distinguish positioning device tracks corresponding to different Bluetooth positioning devices, the first electronic device may create a corresponding data structure for the Bluetooth positioning device when receiving an identification signal of the Bluetooth positioning device for the first time, and then, when receiving an identification signal of the Bluetooth positioning device, may store the location information of the identification signal in the data structure corresponding to the Bluetooth positioning device. In this way, the first electronic device may separately store location information corresponding to different Bluetooth positioning devices in different data structures. A plurality of pieces of location information corresponding to a same Bluetooth positioning device stored in a data structure constitute a positioning device track corresponding to the Bluetooth positioning device.

The location information corresponding to the Bluetooth positioning device refers to location information obtained when the first electronic device receives the identification signal of the Bluetooth positioning device.

For example, the foregoing data structure may be a list.

Further, to separately store location information in different forms, a data structure corresponding to a Bluetooth positioning device may include a base station list used to store a base station identifier, a network list used to store a network identifier, and a coordinate list used to store geographical coordinates.

Figure 9:
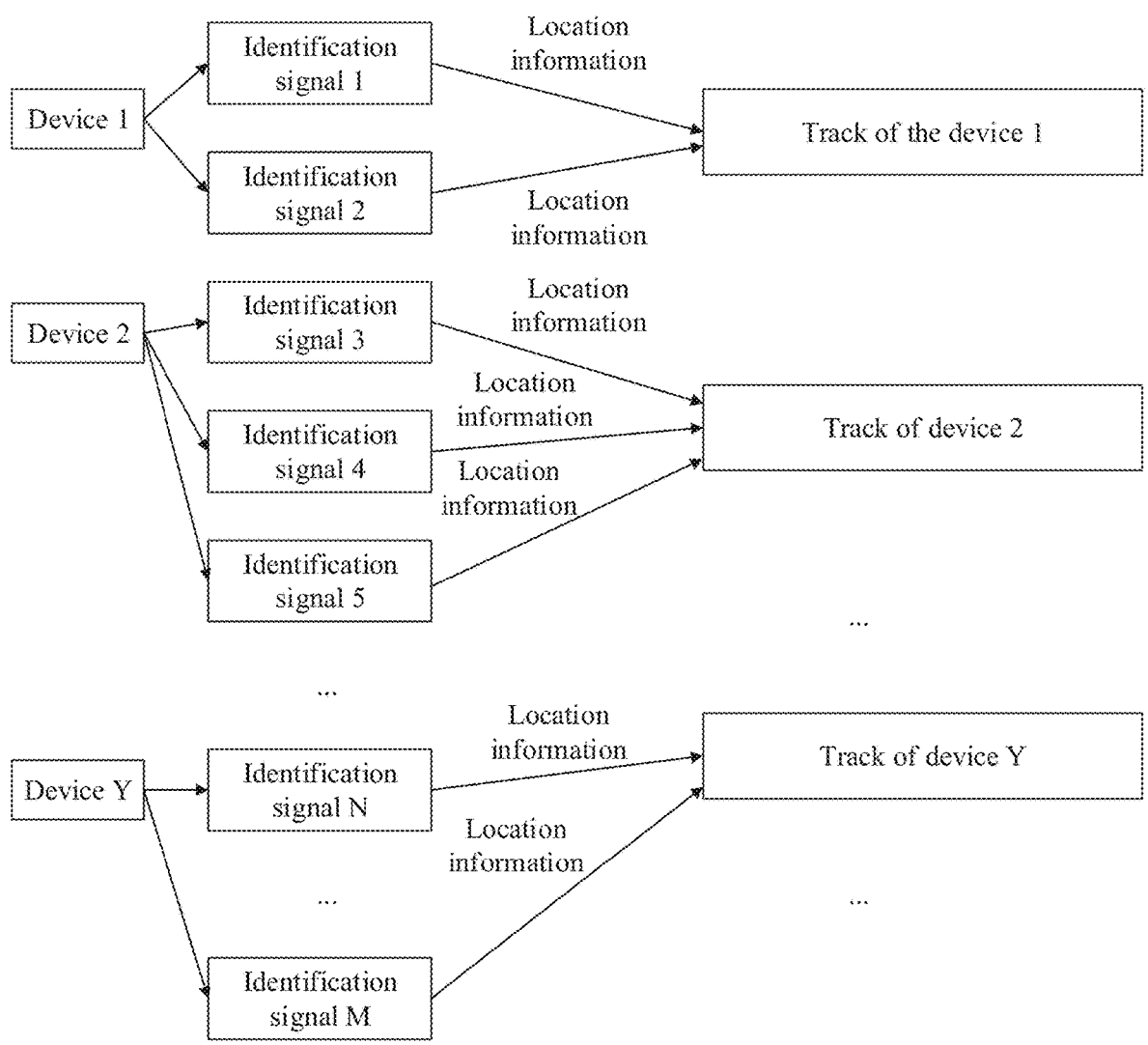
FIG. 9 is an example of an implementation process of a method for recording a track of a positioning device disclosed in an embodiment of this application.

With reference to FIG. 9, the method for recording a positioning device track provided in this embodiment is further described. FIG. 9 is an example of an implementation process of the method for recording a positioning device track according to an embodiment of this application.

After the first electronic device is powered on, when an obtained first identification signal is an identification signal 1, the first electronic device finds, by identifying a source Bluetooth positioning device of the identification signal 1, that an identification signal from a same Bluetooth positioning device with the identification signal 1 is not obtained previously. Therefore, the first electronic device marks a source Bluetooth positioning device of the identification signal 1 as the device 1, creates a list used to store a moving track for the device 1, records the list as a track of the device 1, and then stores location information of the electronic device when the identification signal 1 is obtained to the track of the device 1.

When the first electronic device obtains an identification signal 2, the first electronic device finds, by identifying a source Bluetooth positioning device of the identification signal 2, that the identification signal 2 and the identification signal 1 are from a same Bluetooth positioning device. Therefore, location information of the electronic device when the identification signal 2 is obtained is stored in a list corresponding to the device 1, that is, a track of the device 1.

When the first electronic device obtains an identification signal 3, the first electronic device identifies that a source Bluetooth positioning device of the identification signal 3 is not the same as the source Bluetooth positioning device of the identification signals 1 and 2. Therefore, the first electronic device marks the source Bluetooth positioning device of the identification signal 3 as a device 2, creates a list used to store the moving track of the device 2, records the list as a track of the device 2, and then stores location information of the electronic device when the identification signal 3 is obtained to the track of the device 2.

When the first electronic device obtains identification signals 4 and 5, the first electronic device identifies that source Bluetooth positioning devices of the identification signals 4 and 5 and the source Bluetooth positioning device of the identification signals 3 are the same device, and then stores location information of the electronic device when the identification signals 4 and 5 are obtained to the list corresponding to the device 2, that is, the track of the device 2.

The first electronic device may repeat the foregoing process each time the identification signal is obtained subsequently, and store the location information of the electronic device when the identification signal is obtained in the corresponding list.

It is assumed that when an identification signal M is obtained, the first electronic device has separately created corresponding lists for X devices, and the lists are sequentially recorded as a track of a device 1 to a track of a device X. The first electronic device identifies that the identification signal M and previously received identification signal N (N is less than M) are from a same Bluetooth positioning device, and the identification signal N is sent by device Y. Therefore, the first electronic device adds location information of the electronic device when the identification signal M is obtained to a list corresponding to the device Y, that is, a track of the device Y.

It may be learned from FIG. 9 that, by performing the method for recording a positioning device track provided in step 304, the first electronic device may distinguish whether a plurality of obtained identification signals are from a same Bluetooth positioning device, and store a plurality of pieces of location information corresponding to a same Bluetooth positioning device in a same data structure, to separately store moving tracks of different Bluetooth positioning devices by using a plurality of data structures.

In some embodiments, when two users walk together, a first electronic device held by one user needs to avoid misdetermining that a Bluetooth positioning device held by the other user is tracking the first electronic device. In this scenario, after identifying an identity of a source Bluetooth positioning device of an identification signal, the first electronic device further determines whether the source Bluetooth positioning device is a secure Bluetooth positioning device. If the source Bluetooth positioning device of the identification signal is a secure Bluetooth positioning device, the first electronic device does not need to obtain and store location information of the first electronic device. If the source Bluetooth positioning device of the identification signal is not a secure Bluetooth positioning device, the first electronic device obtains and stores the location information of the first electronic device.

Figure 8A:
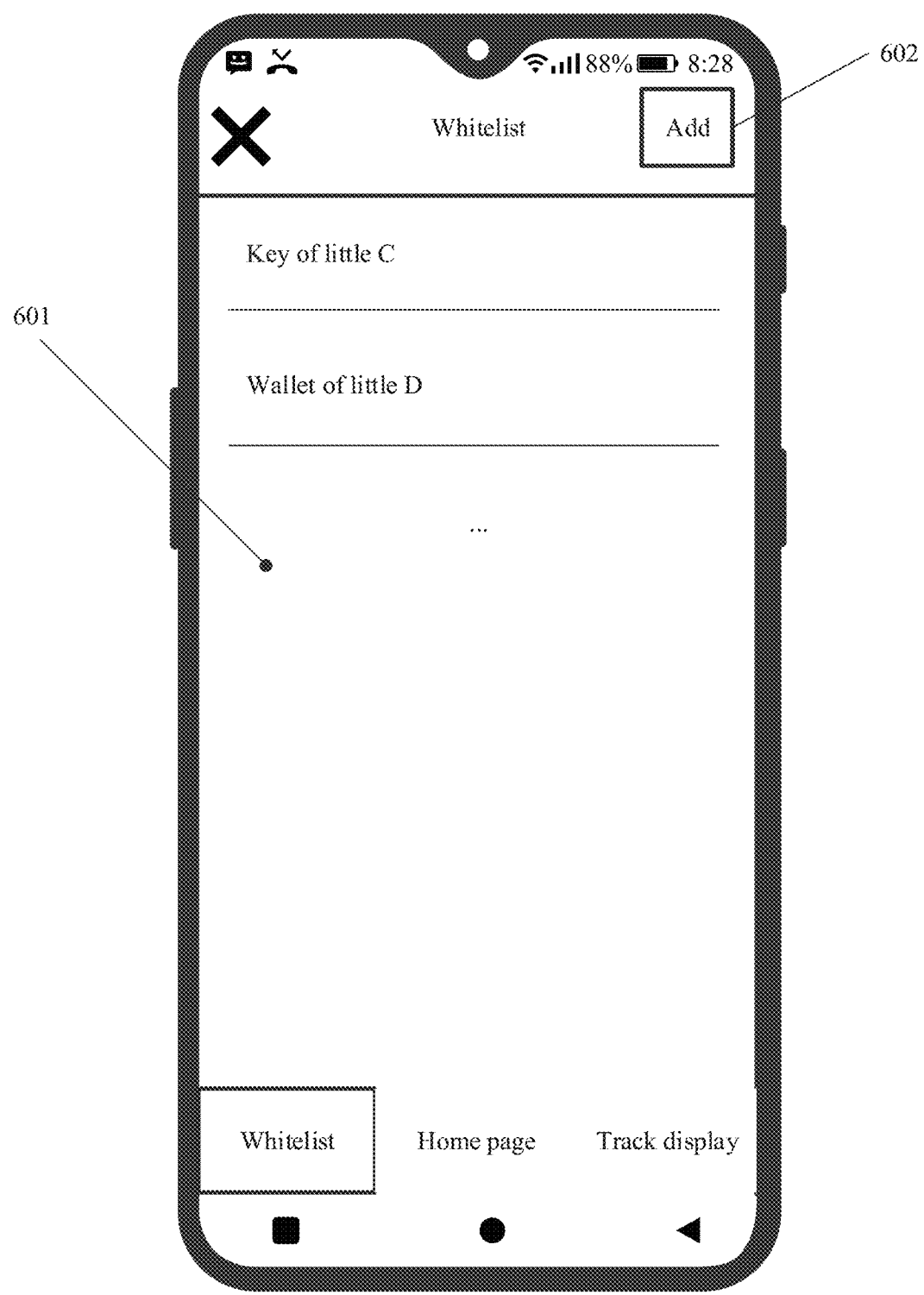
FIG. 8a is a schematic diagram of a whitelist display interface disclosed in an embodiment of this application.

A specific application scenario is used as an example for description. A mobile phone of a user A installs the first electronic device provided in this embodiment, and a user B places a Bluetooth positioning device in a wallet to avoid losing the wallet. When the user A and the user B walk together, the user A may enable the first electronic device of the mobile phone, and tap a "whitelist" option shown in FIG. 4a. Then, the first electronic device presents a whitelist display interface 601 shown in FIG. 8a on a screen of the mobile phone. The whitelist display interface is used to display a device name of each secure Bluetooth positioning device recorded by the first electronic device. As shown in FIG. 8a, "key of little C" and "wallet of little D" are device names of recorded secure Bluetooth positioning devices.

Figure 8B:
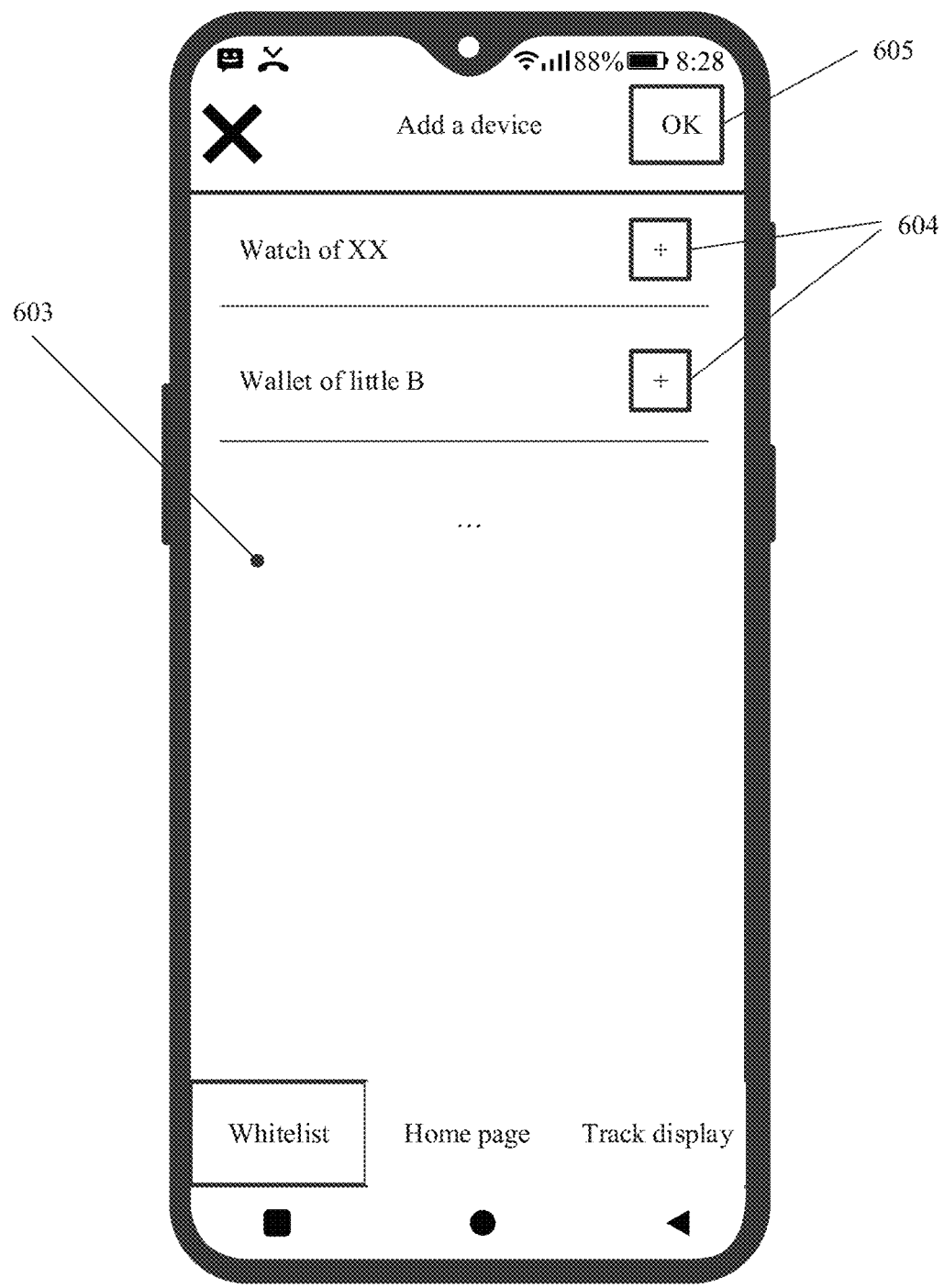
FIG. 8b is a schematic diagram of an interface for adding a secure Bluetooth positioning device disclosed in an embodiment of this application.

In the whitelist display interface shown in FIG. 8a, the user A may tap an "Add" button 602 in an upper right corner of the interface. After the user taps 602, the first electronic device presents an interface 603 for adding a secure Bluetooth positioning device shown in FIG. 8b. The first electronic device displays a device name of a source Bluetooth positioning device of each identification signal received within a recent period of time, for example, within a last two minutes, as shown in FIG. 8b, "watch of XX" and "wallet of little B". The user A finds a device name that needs to be set as a secure Bluetooth positioning device, and taps a selection button 604 on the right side of the device name, thereby selecting a corresponding Bluetooth positioning device. As shown in FIG. 8b, the user A taps the button 604 on the right side of the "little B's wallet" to select a Bluetooth positioning device corresponding to the "little B's wallet". After selecting, the user A taps an "OK" button 605 in an upper right corner of 603 to add the selected Bluetooth positioning device as the secure Bluetooth positioning device. After the user A taps 605, the first electronic device may automatically return to the interface 601.

A manner of obtaining a device name of a source Bluetooth positioning device of an identification signal is as follows: If the identification signal carries the device name of the source Bluetooth positioning device, the first electronic device directly reads the device name from the identification signal. If the identification signal does not carry the device name of the source Bluetooth positioning device, after obtaining an identification signal, the first electronic device sends a device name query request to the source Bluetooth positioning device of the identification signal, so as to obtain the device name of the source Bluetooth positioning device of the identification signal.

When a Bluetooth positioning device is set as a secure Bluetooth positioning device, the first electronic device records an identity of the secure Bluetooth positioning device at this time and RSSI data of an identification signal from the Bluetooth positioning device. Then, when the first electronic device obtains an identification signal that carries a same identity, or obtains an identification signal whose RSSI data does not have a significant difference, the first electronic device may identify that a source Bluetooth positioning device of the identification signal is a secure Bluetooth positioning device.

In some possible embodiments, after it is determined that a source Bluetooth positioning device is an insecure device, the first electronic device further determines whether a distance between the source Bluetooth positioning device and the electronic device exceeds a preset distance threshold. If the distance between the source Bluetooth positioning device and the electronic device does not exceed the distance threshold, the first electronic device performs a subsequent step of obtaining and storing the location information of the first electronic device. If the distance between the source Bluetooth positioning device and the electronic device exceeds the distance threshold, the first electronic device does not perform the subsequent step of obtaining and storing the location information of the first electronic device. In a specific example, the distance threshold may be set to 70 meters.

As described above, the RSSI data of the radio signal is related to the transmission distance of the signal. Therefore, after obtaining the identification signal, the first electronic device calculates the distance between the source Bluetooth positioning device of the identification signal and the electronic device itself based on the RSSI data of the identification signal.

When the Bluetooth positioning device is used to track a user, a distance between the Bluetooth positioning device and an electronic device of the user is generally relatively close. Therefore, when the distance between the Bluetooth positioning device and the electronic device is relatively far, a risk that the user of the electronic device is tracked by the Bluetooth positioning device is relatively small. When the first electronic device provided in this embodiment obtains the identification signal, a Bluetooth positioning device with less risk of tracking is screened out by detecting a distance between the source Bluetooth positioning device of the identification signal and the electronic device, and then skip recording and processing a moving track of the Bluetooth positioning device with less risk of tracking, thereby saving a processor resource and a memory resource of the electronic device.

Similar to a mobile terminal track, a positioning device track may include a base station list that is created by the first electronic device and that is used to store a base station identifier, a network list that is created by the first electronic device and that is used to store a network identifier of a wireless local area network, and a coordinate list that is created by the first electronic device and that is used to store geographical coordinates.

When 304 is performed, the first electronic device may combine repeated location information by using the method described in step 303. For a specific process, refer to the foregoing description.

By performing step 304, each time the first electronic device receives an identification signal, the first electronic device identifies a source Bluetooth positioning device of the identification signal, and then obtains, based on location information corresponding to the source Bluetooth positioning device that stores the identification signal, a moving track of the positioning device that includes a plurality of pieces of location information corresponding to the Bluetooth positioning device.

In some possible embodiments, an execution sequence of step 303 and step 304 may be interchanged, and is not limited to the sequence described in this embodiment.

Referring to a device interaction process shown in FIG. 5A and FIG. 5B, in some possible embodiments, step 303 may include step 505, step 507, step 508, step 509, and step 510 shown in FIG. 5A and FIG. 5B.

In some possible embodiments, step 303 may be specifically performed by the anti-tracking application installed on the first electronic device. When performed by the anti-tracking application, a specific execution process of step 303 may refer to the embodiment corresponding to FIG. 7.

305: Calculate a track similarity between a positioning device track and a mobile terminal track.

After the track similarity is calculated, if the track similarity is greater than a similarity threshold, step 306 is performed. If the track similarity is less than or equal to the similarity threshold, step 305 may be performed again.

In some possible embodiments, step 306 may be performed when the track similarity is greater than or equal to the similarity threshold, and step 305 is performed again when the track similarity is less than the similarity threshold.

For example, the similarity threshold may be set to 0.65.

It should be noted that, in step 305, the first electronic device specifically calculates the track similarity between the positioning device track and the mobile terminal track in a specific time period.

For example, the first electronic device may calculate the track similarity between the positioning device track and the mobile terminal track that are recorded in last four hours. That is, the first electronic device may use a set of location information recorded in steps 303 and 304 in the last four hours as the mobile terminal track, and use a set of location information recorded in step 304 in the last four hours the positioning device track, and then calculate a similarity between the two sets, so that the obtained calculation result is the track similarity.

Figure 11:
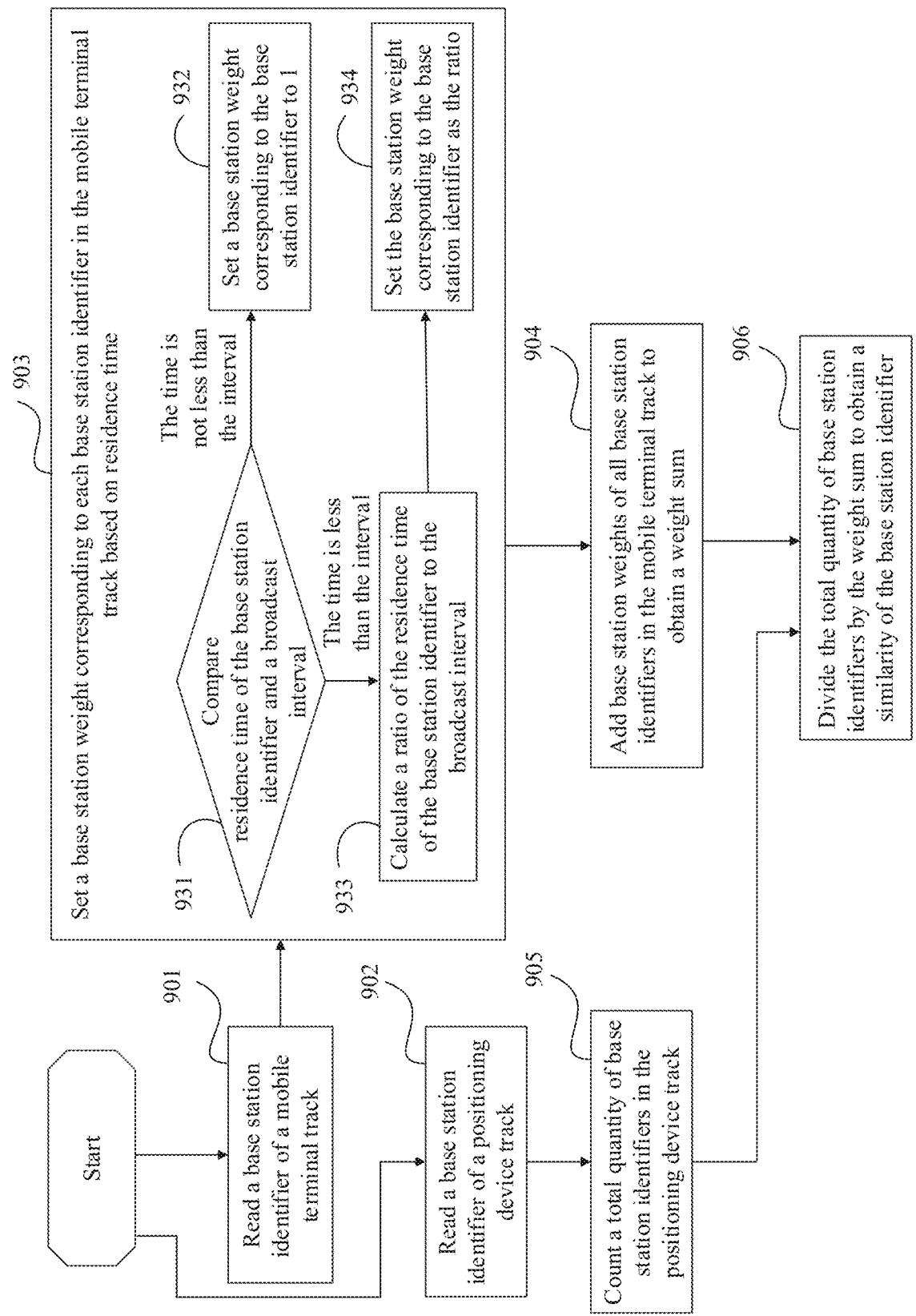
FIG. 11 is a flowchart of a method for calculating a similarity of a base station identifier disclosed in an embodiment of this application.

In some embodiments, for a specific implementation process of step 305, refer to the embodiment corresponding to FIG. 11. Details are not described herein again.

For example, step 305 may be specifically performed by the anti-tracking application installed on the first electronic device.

306: Prompt that the user is tracked.

After the first electronic device calculates that track similarities between tracks of any one or more positioning devices and the mobile terminal track are greater than the similarity threshold, the first electronic device prompts that the user is tracked by corresponding Bluetooth positioning devices.

Optionally, when detecting that the electronic device is tracked by the Bluetooth positioning device corresponding to the positioning device track, the first electronic device immediately gives a prompt. Or, to avoid false prompt, the first electronic device temporarily does not prompt when detecting that the electronic device is tracked by the Bluetooth positioning device corresponding to the positioning device track, but prompts the user when continuously detecting that the electronic device is tracked by the Bluetooth positioning device corresponding to the positioning device track within a specific time (for example, 2 minutes). Or, when detecting that the electronic device is tracked by the Bluetooth positioning device corresponding to the positioning device track, the first electronic device determines whether the electronic device is in a Do Not Disturb mode. If the electronic device is not in the Do Not Disturb mode in this case, the first electronic device prompts that the user is tracked. If the electronic device is in the Do Not Disturb mode in this case, the first electronic device waits for the electronic device to exit the Do Not Disturb mode before prompting that the user is tracked.

In some possible embodiments, the first electronic device may prompt, in a plurality of manners, that the user is tracked.

For example, the first electronic device may prompt that the user is tracked in the following several manners.

1. When a user needs to be prompted, if the user is using another application of the electronic device (except the first electronic device), the first electronic device may pop up a tracking prompt message on a top of a display screen of the electronic device. In this case, the user may pull down a message notification bar from the top of the display screen to view the tracking prompt message.

Figure 12:
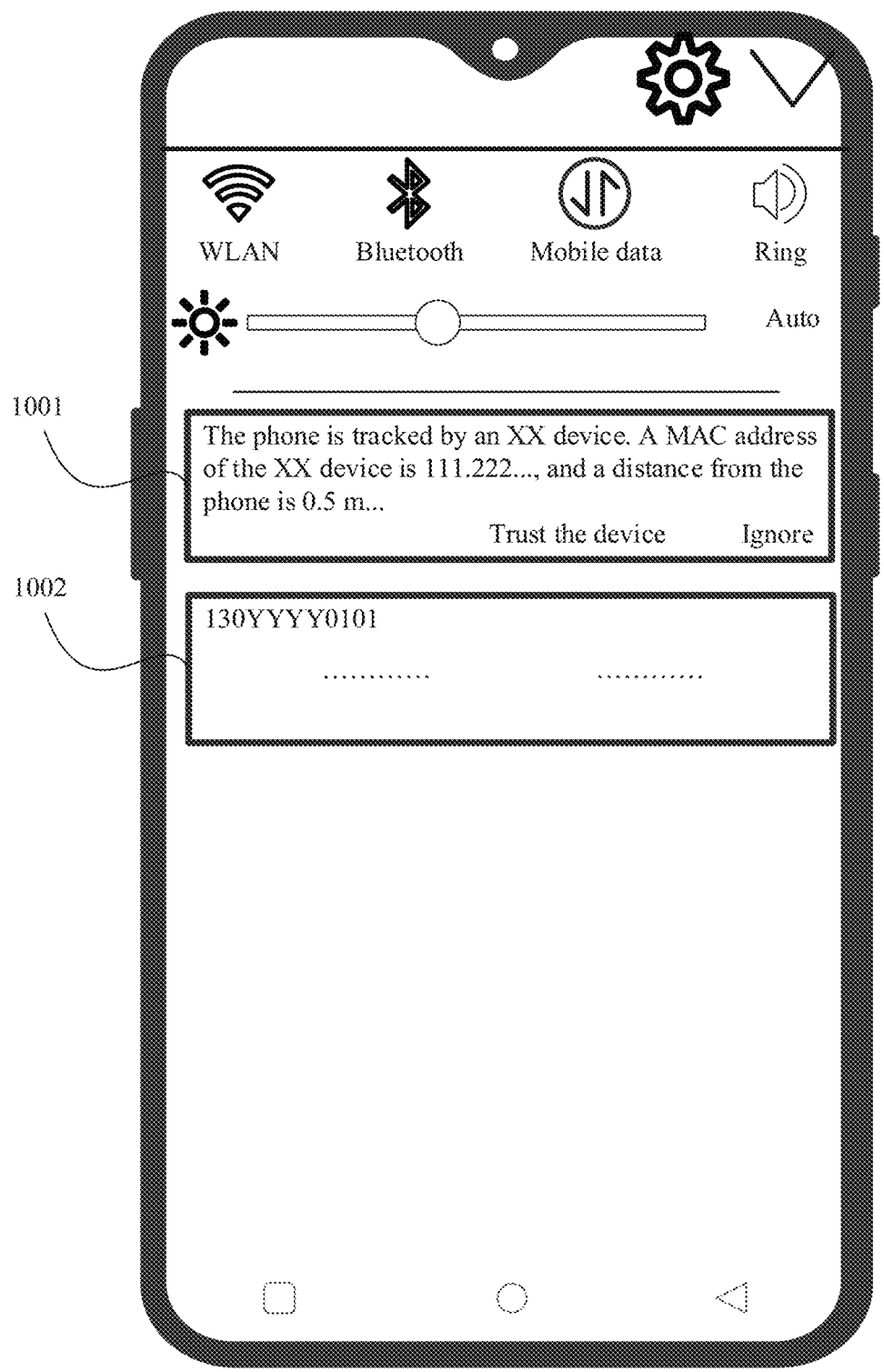
FIG. 12 is a schematic diagram of an interface of presenting a tracking prompt message in a message notification bar disclosed in an embodiment of this application.

FIG. 12 is a schematic diagram of an interface for presenting the tracking prompt message in the message notification bar according to an embodiment of this application. As shown in FIG. 12, the message notification bar of the electronic device may present notification messages of a plurality of applications on the electronic device. For example, 1001 is a tracking prompt message output by the first electronic device, and 1002 is a short message output by a short message application.

Still referring to FIG. 12, when viewing the tracking prompt message in the message notification bar, the user may tap a "Trust the device" option in the tracking prompt message, so that a Bluetooth positioning device indicated by the tracking prompt message is set to the foregoing secure Bluetooth positioning device.

When the first electronic device detects that the electronic device is tracked by a plurality of Bluetooth positioning devices, the first electronic device may output, in the message notification bar shown in FIG. 12, a tracking prompt message for each Bluetooth positioning device that is tracking.

Figure 13:
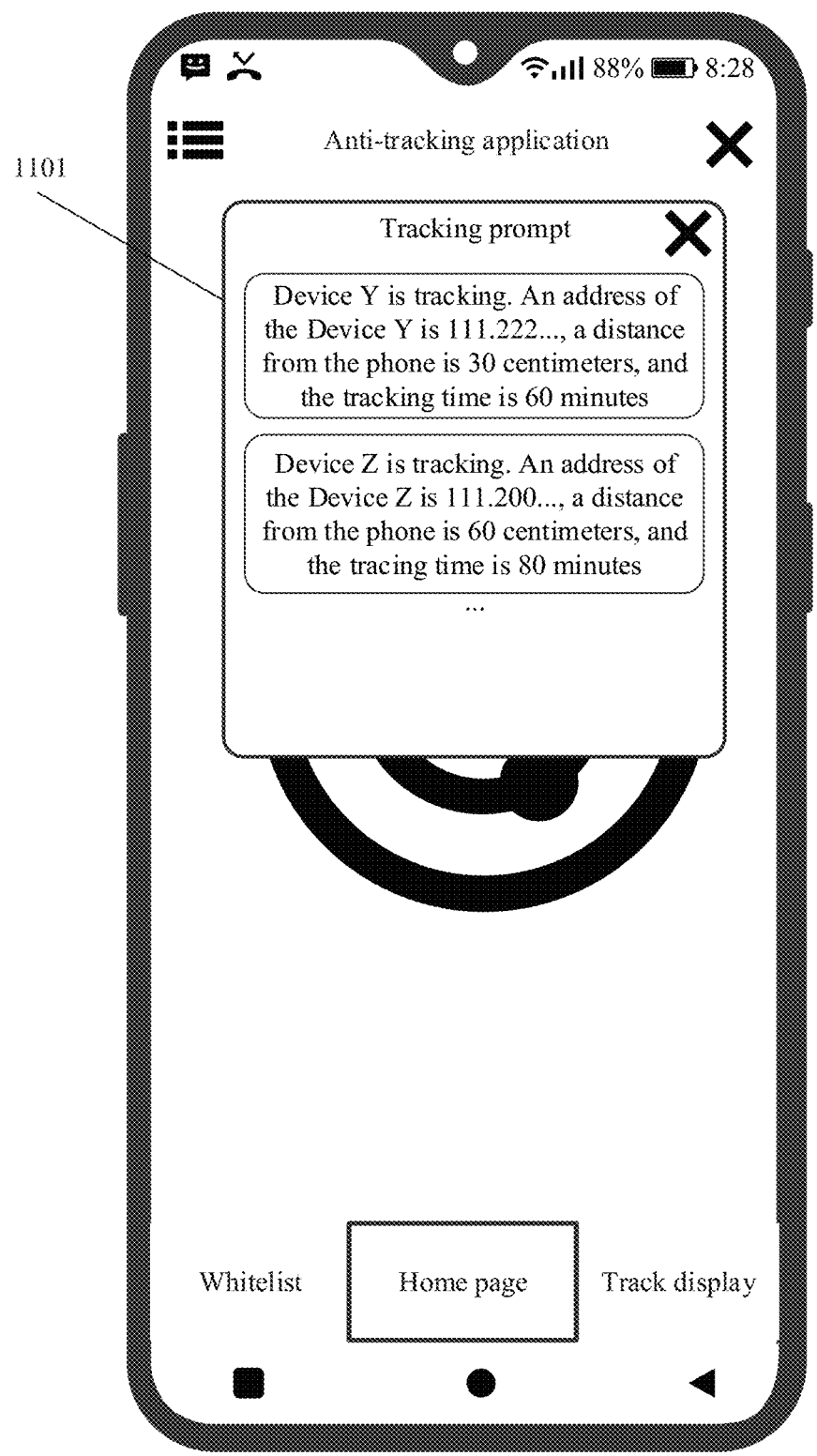
FIG. 13 is a schematic diagram of a tracking prompt window disclosed in an embodiment of this application.

2. FIG. 13 is a schematic diagram of a tracking prompt window according to an embodiment of this application. When the user is using the first electronic device, the first electronic device may pop up a tracking prompt window 1101. The tracking prompt window presents each Bluetooth positioning device that is detected by the first electronic device and that is tracking the electronic device, and tracking time of these Bluetooth positioning devices.

A tracking time of a Bluetooth positioning device refers to a time period from when the first electronic device obtains an identification signal of the Bluetooth positioning device for the first time until the first electronic device detects that the Bluetooth positioning device is tracking the electronic device.

3. If the first electronic device detects that the electronic device is tracked by the Bluetooth positioning device, the electronic device is in a sleep state (that is, the user does not use the electronic device). The first electronic device may output a tracking prompt by using one or more components of the electronic device. For example, the first electronic device triggers a motor of the electronic device to vibrate, or outputs a prompt tone by using a speaker of the electronic device, or controls one or more prompt lights of the electronic device to flash. The prompt tone output by the speaker may be a preset ringtone, or may be a prompt voice synthesized by the first electronic device.

When the first electronic device finds that a Bluetooth positioning device is tracking the electronic device, and further presents a tracking prompt on a display screen of the electronic device, the tracking prompt may specifically include:

An identity carried by a most recent identification signal sent by the Bluetooth positioning device that is tracking (for example, may be a MAC address of the Bluetooth positioning device), and a distance between the Bluetooth positioning device that is tracking and the electronic device, where the distance between the Bluetooth positioning device and the electronic device may be calculated based on RSSI data of the identification signal sent by the Bluetooth positioning device.

4. When the user wears one or more wearable devices and the wearable devices and the electronic device have established communication connections, the first electronic device may send tracking prompt messages to the communication-connected wearable devices, so as to trigger the wearable devices to perform a corresponding action to prompt the user.

Figure 14:
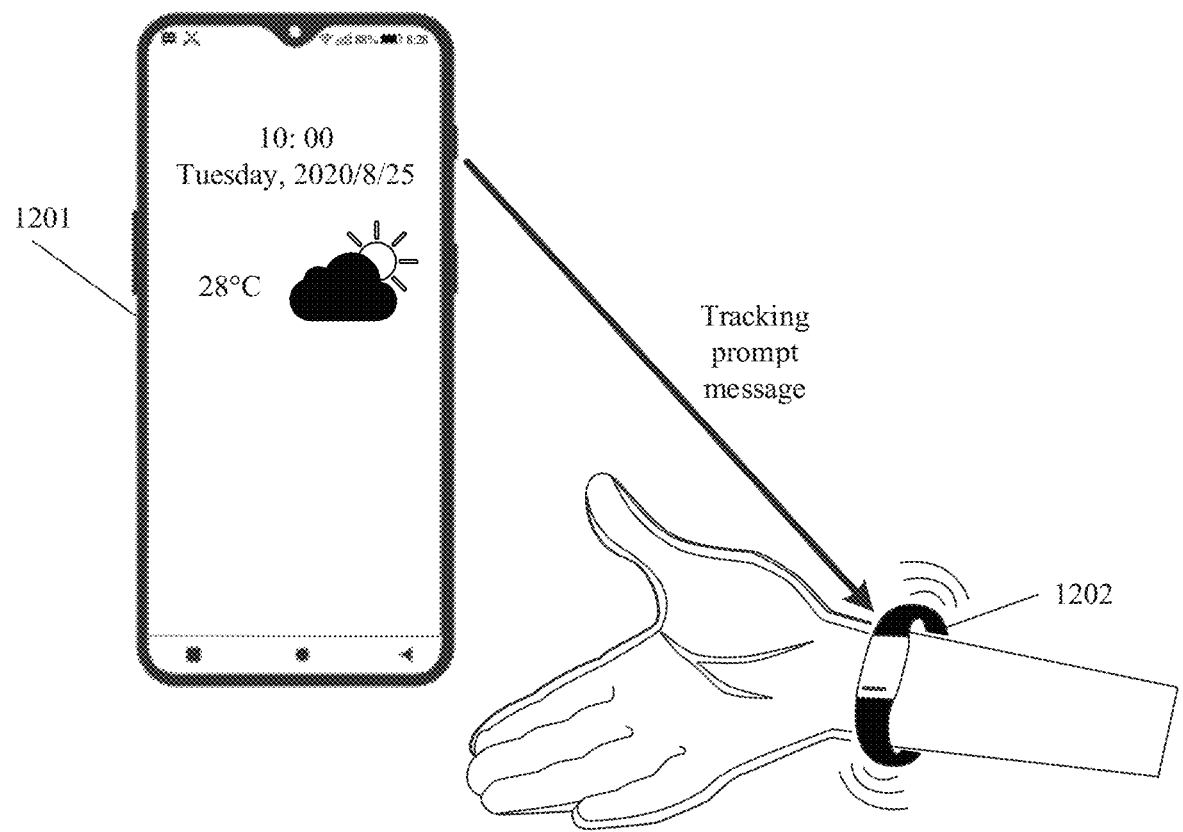
FIG. 14 is a schematic diagram of outputting a tracking prompt by using a wearable device disclosed in an embodiment of this application.

FIG. 14 is used as an example. FIG. 14 is a schematic diagram of outputting a tracking prompt by using a wearable device according to an embodiment of this application. When an electronic device 1201 communicates with a wristband 1202 worn by the user, the first electronic device sends a tracking prompt message to the wristband, and then the wristband starts shaking and sends a prompt tone in responds to the tracking prompt message.

In some possible embodiments, step 306 may include step 515 and step 516 shown in FIG. 5B.

307: Stop scanning a Bluetooth signal.

It should be noted that step 307 is an optional step in this embodiment of this application. In some optional embodiments, after enabling the tracking detection function, the first electronic device may continuously scan the Bluetooth signal. Therefore, the first electronic device does not need to stop scanning the Bluetooth signal.

The first electronic device may stop scanning the Bluetooth signal when detecting that the first electronic device meets a specific disabling condition.

For example, the disabling condition may include: The electronic device receives an operation in which the user actively disables the tracking detection function; the electronic device receives an operation of disabling a display by the user; the electronic device automatically turns off the display after a certain time; and the electronic device continuously runs a program that provides a tracking detection function for a time greater than or equal to a preset run-time threshold. For example, the run-time threshold may be set to 30 minutes.

In some possible embodiments, the electronic device may not prompt that the user is tracked when the track similarity is greater than the similarity threshold. Therefore, step 306 is an optional step.

In some possible embodiments, the program that provides the tracking detection function may continue to run in the background after the electronic device is powered on, and it is not necessary to stop scanning the Bluetooth signal in this case. Therefore, step 307 is an optional step.

The steps of the Bluetooth positioning device detection method provided in the embodiments of this application, including Bluetooth scanning, recording a mobile terminal track, recording a positioning device track, calculating a similarity between the tracks, and tracking prompts, may be performed in parallel according to the foregoing implementation manner after a tracking detection function is enabled on a first electronic device, and is not limited to a specific execution sequence.

For example, the first electronic device may continue to scan the Bluetooth signal while prompting that the user is tracked, record the mobile terminal track in response to receiving the status signal, and record the positioning device track in response to receiving the identification signal.

The Bluetooth positioning device detection method provided in this embodiment has the following beneficial effects:

When the user is tracked by the Bluetooth positioning device, the first electronic device of the user's mobile phone (or another electronic device) finds, by performing the foregoing Bluetooth positioning device detection method, that a moving track of the mobile phone is similar to a moving track of a Bluetooth positioning device near the mobile phone, and further prompts the user that the user is being tracked by the Bluetooth positioning device, so as to protect privacy of the user and prevent the user from being tracked.

Referring to FIG. 5A and FIG. 5B, the following describes, with reference to the device interaction process, the Bluetooth positioning device detection method provided in this embodiment of this application.

As shown in FIG. 5A and FIG. 5B, the following device interaction process involves a first electronic device, a second electronic device, and a Bluetooth positioning device. The first electronic device includes a Bluetooth controller (Bluetooth Controller, BT Controller), a Bluetooth host (Bluetooth Host, BT Host), and a peripheral module. For example, the Bluetooth host (Bluetooth Host) may be the processor shown in FIG. 1. The peripheral module may include the wireless communication module, the mobile communication module, the satellite positioning module in the wireless communication module in FIG. 1, and may further include the display, the motor, the speaker, and the like that are shown in FIG. 1.

After the first electronic device is powered on, the Bluetooth host performs step 501 to detect that the first electronic device meets an enabling condition.

For example, that the Bluetooth host detects that the first electronic device meets the enabling condition may be that the Bluetooth host detects that the display screen of the first electronic device is on.

After the first electronic device meets the enabling condition, the Bluetooth host performs step 502 to construct a signal filter, and step 503 to configure the signal filter.

After obtaining the signal filter configured by the Bluetooth host, the Bluetooth controller performs step 504 to scan a Bluetooth signal.

Through scanning, the Bluetooth controller may perform step 505 to receive an identification signal, and step 506 to receive a status signal. The Bluetooth identification signal is broadcast by the Bluetooth positioning device, and the Bluetooth status signal is broadcast by the second electronic device.

After receiving the Bluetooth identification signal, the Bluetooth controller performs step 507 to send the identification signal to the Bluetooth host. In response to receiving the Bluetooth identification signal, the Bluetooth host performs step 508 to identify a source Bluetooth positioning device of the identification signal, step 509 to read location information of the first electronic device, and step 510 to store the location information of the first electronic device.

In some optional embodiments, when step 508 is performed, the first electronic device may identify the source Bluetooth positioning device of the identification signal in a plurality of manners. A specific identification method is not limited in this embodiment of this application. For example, the first electronic device may identify the source Bluetooth positioning device of the identification signal in a manner of merging the identification signals.

After receiving the Bluetooth status signal, the Bluetooth controller performs step 511 to send the Bluetooth status signal to the Bluetooth host. In response to receiving the Bluetooth status signal, the Bluetooth host performs step 512 to read the location information of the first electronic device and step 513 to store the location information of the first electronic device.

The Bluetooth host performs step 514 to calculate a track similarity between the positioning device track and the mobile terminal track. When the track similarity is greater than the similarity threshold, the Bluetooth host performs step 515 to indicate that the first electronic device is tracked, and the peripheral module performs step 516 to prompt that the user is tracked in response to an indication of the Bluetooth host.

The Bluetooth host may perform step 517 to clean the positioning device track and the mobile terminal track.

In some optional embodiments of this application, to avoid occupying too much storage space of the electronic device, the first electronic device cleans the positioning device track and track of the mobile terminal that are stored in the electronic device. The first electronic device may be cleaned in any one or more of the following cleaning manners:

1. The first electronic device periodically cleans the positioning device track and the mobile terminal track. For example, cleaning may be performed every 24 hours (h).

For example, cleaning is performed every 24 hours (h). The first electronic device may delete location information added between zero o'clock of the previous day from the mobile terminal track and the positioning device track at zero o'clock of each day. For example, it is at zero o'clock on the 23rd currently. The first electronic device deletes position information added before zero o'clock on the 22nd from the mobile terminal track and the positioning device track.

2. When the user sets any Bluetooth positioning device as a secure Bluetooth positioning device, the first electronic device may delete a positioning device track of the Bluetooth positioning device.

3. When any positioning device track is not added with new location information for a long time, the first electronic device deletes the positioning device track.

Taking 60 minutes as an example, the first electronic device may set a timer for each positioning device track. Each time the first electronic device adds location information to a positioning device track, the first electronic device clears a timer corresponding to the positioning device track. When the first electronic device does not add location information to a positioning device track, a timer corresponding to the positioning device track continues to time. If a timer of any positioning device track is timed to 60 minutes, it indicates that the first electronic device does not add location information to the positioning device track for 60 consecutive minutes. In this case, the first electronic device determines that a Bluetooth positioning device corresponding to the positioning device track has left a range near the electronic device, and the electronic device is not tracked by the Bluetooth positioning device corresponding to the positioning device track. Therefore, the positioning device track may be directly deleted.

4. After the first electronic device outputs a tracking prompt, and the user does not process the tracking prompt output by the first electronic device for a long time, or the user actively ignores the tracking prompt output by the first electronic device, the first electronic device may delete a moving track of the Bluetooth positioning device for which the tracking prompt is intended.

5. Before cleaning a positioning device track based on the foregoing cleaning manners 1 to 4, the first electronic device may first determine whether the Bluetooth positioning device corresponding to the positioning device track is a suspicious positioning device. If it is determined that the Bluetooth positioning device corresponding to the positioning device track is a suspicious positioning device, the first electronic device does not clean the positioning device track. If it is determined that the Bluetooth positioning device corresponding to the positioning device track is not a suspicious positioning device, the first electronic device cleans the positioning device track. In this way, data related to a suspicious positioning device can be avoided from being cleaned, so as to ensure accuracy of a result of tracking detection.

When detecting that the first electronic device meets the disabling condition, the Bluetooth host performs step 518 to stop scanning the Bluetooth signal.

For example, the Bluetooth host may stop scanning the Bluetooth signal when the screen of the first electronic device is off.

When the Bluetooth signal scanning is stopped, the Bluetooth host may instruct the Bluetooth controller to stop scanning, or may instruct the Bluetooth controller to disable the Bluetooth function of the first electronic device, or may instruct the Bluetooth controller to stop sending the Bluetooth identification signal and the Bluetooth status signal, or may instruct the Bluetooth controller to delete the signal filter of the configured Bluetooth identification signal and the signal filter of the Bluetooth status signal.

Figure 6:
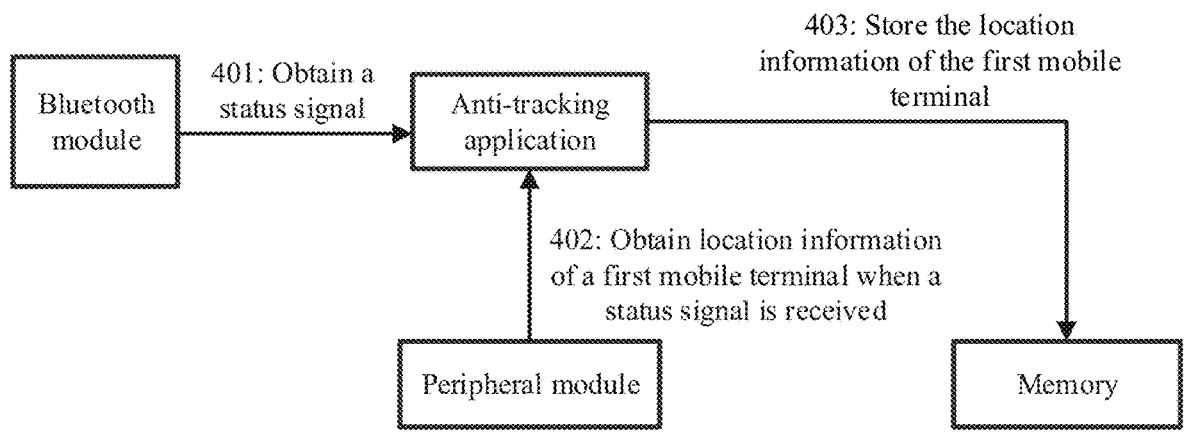
FIG. 6 is a flowchart of a method for recording a mobile terminal track disclosed in an embodiment of this application.

With reference to FIG. 6, a method for recording a mobile terminal track by a first electronic device is described. The method may include the following steps:

401: Obtain a status signal.

As shown in FIG. 6, the status signal is obtained through scanning by the Bluetooth module and reported to the anti-tracking application.

402: Obtain location information of a first electronic device when the status signal is received.

As shown in FIG. 6, the anti-tracking application may obtain location information of an electronic device from a peripheral module.

403: Store the location information of the first electronic device.

As shown in FIG. 6, the anti-tracking application may store the location information of the first electronic device in a memory.

For a specific implementation process of this embodiment, refer to step 303. Details are not described herein again.

Figure 7:
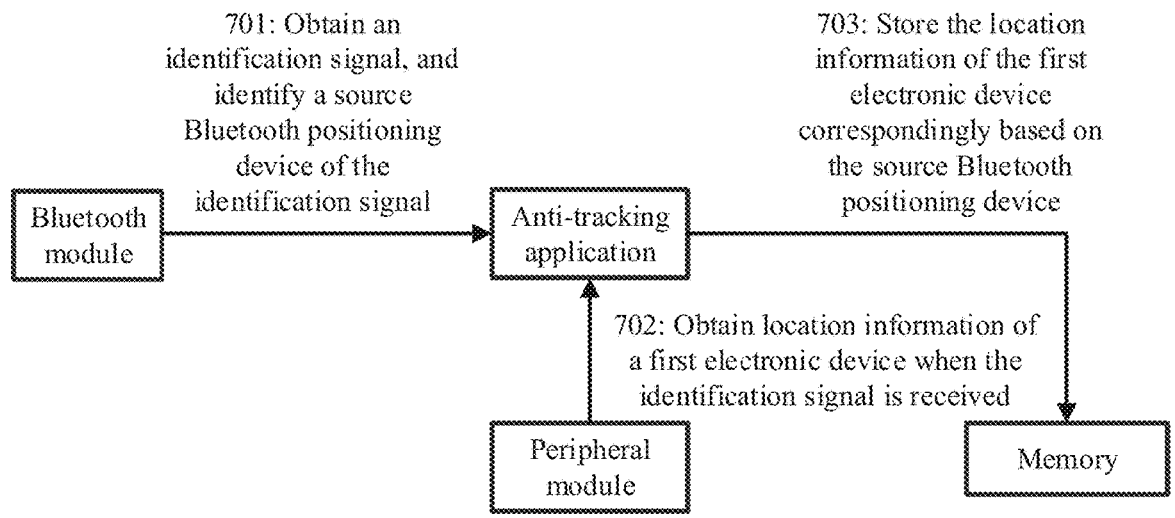
FIG. 7 is a flowchart of a method for recording a positioning device track disclosed in an embodiment of this application.

With reference to FIG. 7, a method for recording a positioning device track is described. The method may include the following steps:

701: Obtain an identification signal, and identify a source Bluetooth positioning device of the identification signal.

As shown in FIG. 7, the identification signal is obtained through scanning by the Bluetooth module and reported to the anti-tracking application.

702: Obtain location information of the first electronic device when the identification signal is received.

As shown in FIG. 7, the anti-tracking application may obtain the location information of the first electronic device from the peripheral module.

703: Store the location information of the first electronic device correspondingly based on the source Bluetooth positioning device.

As shown in FIG. 7, the anti-tracking application may store the location information of the first electronic device in a memory.

For a specific implementation process of this embodiment, refer to the foregoing step 304. Details are not described herein again.

Figure 10A:
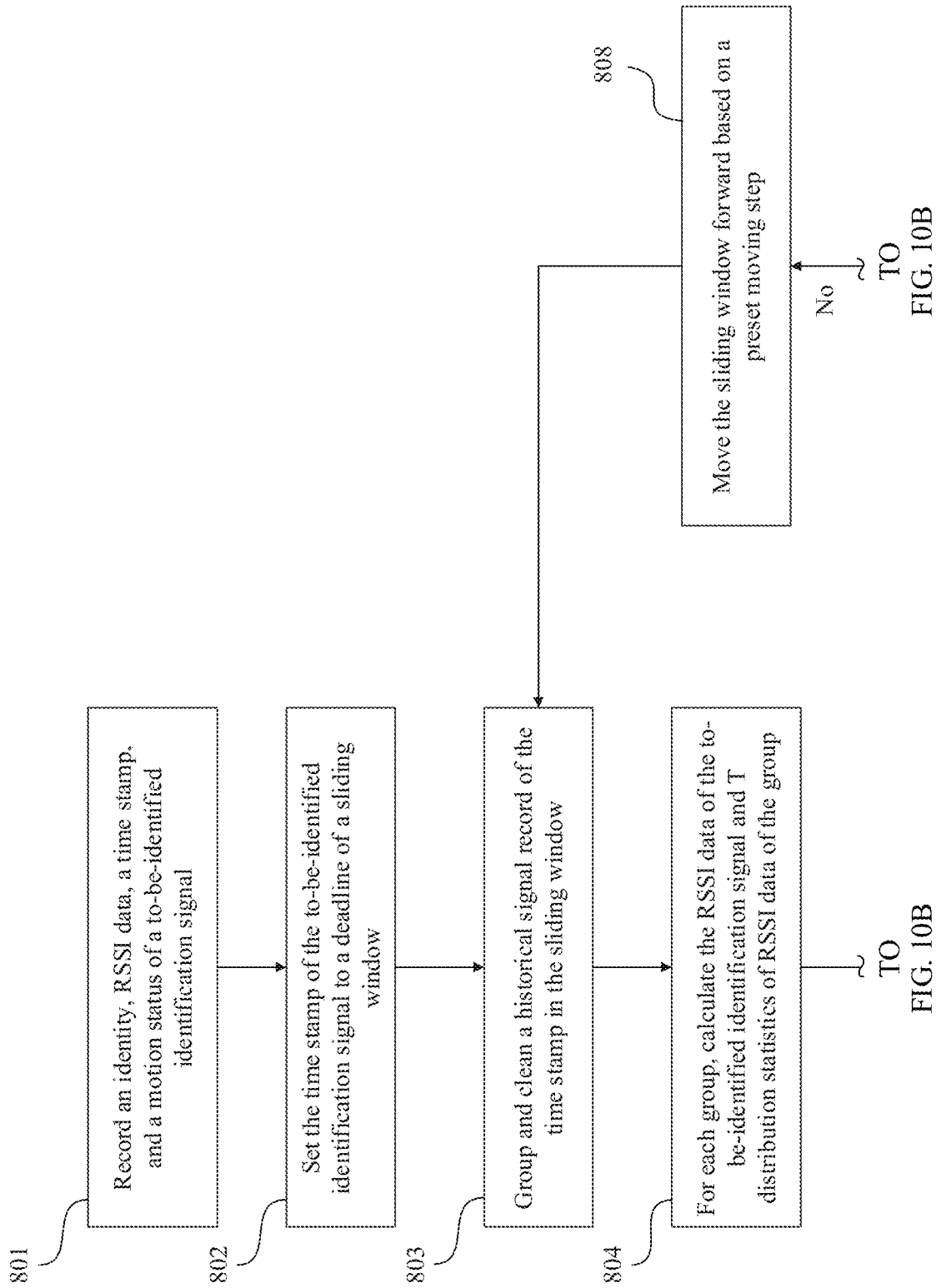
FIG. 10A and FIG. 10B are a flowchart of a signal merging method disclosed in an embodiment of this application.
Figure 10B:
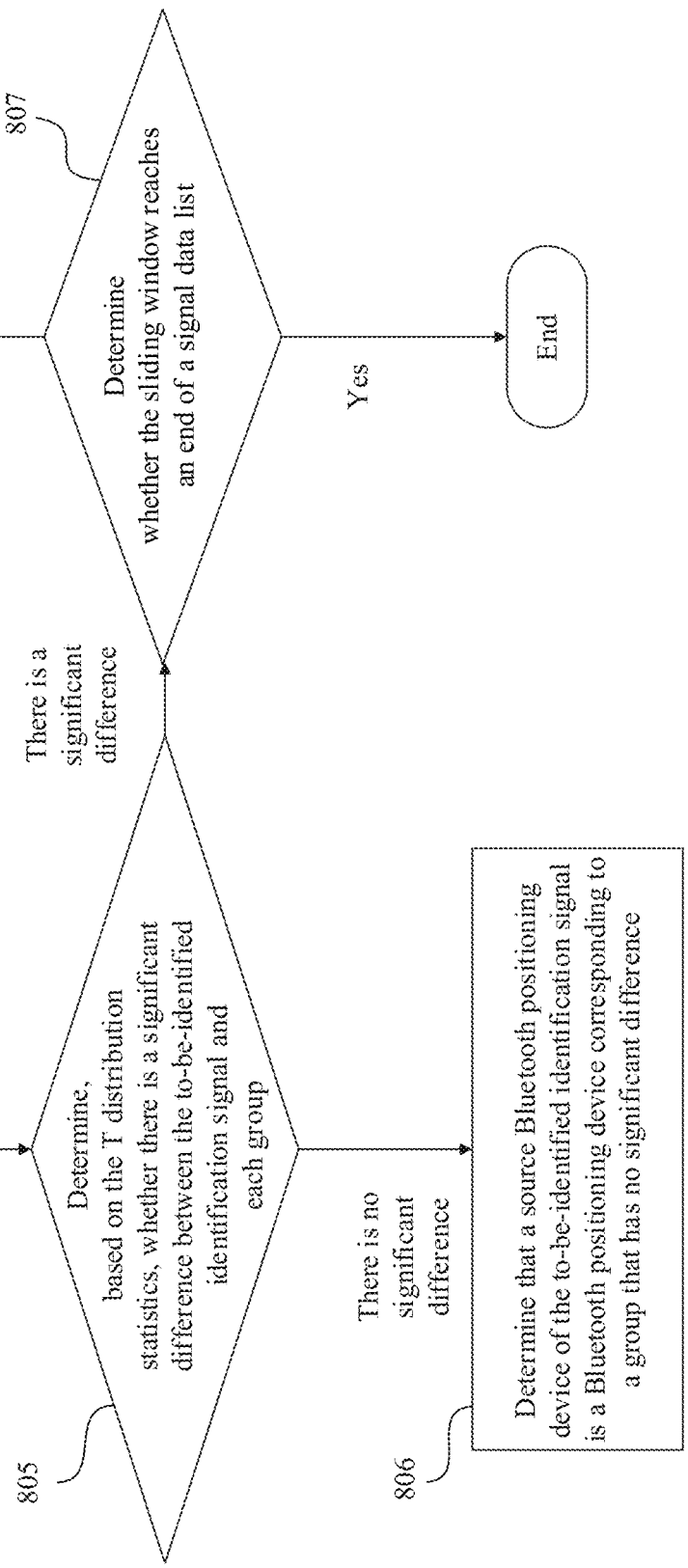

FIG. 10A and FIG. 10B are a flowchart of an identification signal merging method according to an embodiment of this application. The identification signal merging method provided in this embodiment of this application specifically includes:

801: Record an identity, RSSI data, a time stamp, and a motion status of a to-be-identified identification signal.

The motion status may be obtained by an activity recognizition (Activity Recognizition, AR) module of the first electronic device.

After each time an identification signal is obtained, the first electronic device performs the identification signal merging method provided in this embodiment to identify a source Bluetooth positioning device of the identification signal. For ease of distinction, the to-be-identified identification signal is used to identify the identification signal of whose source Bluetooth positioning device needs to be identified.

The time stamp of the to-be-identified identification signal indicates a time of the to-be-identified identification signal received by the Bluetooth module. The motion status of the to-be-identified identification signal indicates a motion status of the electronic device when the Bluetooth module receives the to-be-identified identification signal.

A speed sensor of the electronic device may measure a current speed of the electronic device in real time. When the Bluetooth module receives the to-be-identified identification signal, the first electronic device obtains a speed of the electronic device at this time from the speed sensor, and then determines the motion status of the electronic device at this time based on the speed of the electronic device.

The first electronic device may determine the motion status of the electronic device based on a speed range to which the speed of the electronic device belongs. In an example, if the speed of the electronic device is 0, the motion state of the electronic device is still; if the speed of the electronic device is 4 to 7 kilometers per hour (km/h), the motion state of the electronic device is walking; and if the speed of the electronic device is 40 to 60 km/h, the motion state of the electronic device is riding, and so on.

802: Set the time stamp of the to-be-identified identification signal to a deadline of a sliding window.

The sliding window may be understood as a period of a specific length. For example, the sliding window may be a period of one minute, and the sliding window in 802 is equivalent to a period of one minute to be truncated forward from the time stamp of the to-be-identified identification signal. This period is a sliding window.

803: Group and clean a historical signal record of the time stamp in the sliding window.

The historical signal record is stored in a signal data list, and each historical signal record in the signal data list is corresponding to an identification signal obtained by the first electronic device before the identification signal is to be identified. The historical signal record includes RSSI data, a motion status, a time stamp of the corresponding identification signal, and an identity carried by the identification signal.

Grouping refers to dividing a historical signal record corresponding to a historical identification signal of a same Bluetooth positioning device into a group. Cleaning refers to deleting a historical signal record whose motion status is different from the motion status of the to-be-identified identification signal, identifying a historical signal record whose RSSI data is abnormal by using a Grubbs (Grubbs) algorithm, and deleting the historical signal record whose RSSI data is abnormal.

In an example, it is assumed that 100 historical signal records are in the sliding window. When 803 is performed, the first electronic device needs to delete a history signal record whose RSSI data is abnormal, and a history signal record whose motion status is different from a motion status of the to-be-identified identification signal in the 100 historical signal records. Then, a historical signal record in the remaining historical signal records corresponding to an identification signal of a same Bluetooth positioning device are divided into a group to obtain one or more groups. After grouping, each group corresponds to a Bluetooth positioning device.

804. For each group, calculate the RSSI data of the to-be-identified identification signal and T distribution statistics of RSSI data of the group.

For any group, the RSSI data of the to-be-identified identification signal and the T distribution statistics (denoted as t) of the RSSI data of the to-be-identified identification signal of the group may be calculated according to the following formula:

$$t = \frac{X - \mu}{s \div \sqrt{n}}$$

In the foregoing formula, X represents an average value of all RSSI data in the group, p represents an average value of RSSI data of a to-be-identified identifier signal, s represents a standard deviation of all RSSI data in the currently calculated group, and n represents a quantity of historical signal records in the currently calculated group.

805: Determine, based on the T distribution statistics, whether there is a significant difference between the to-be-identified identification signal and each group.

A specific determining manner in 805 is as follows:

For each group, a T distribution threshold T1 is found in a T boundary value table based on a degree of freedom of the group and a preset significance level u, and then it is determined whether the T distribution statistics corresponding to the group obtained by calculation in 804 are greater than the found T1. If the T distribution statistics corresponding to the group are greater than T1, it is determined that there is a significant difference between the to-be-identified identification signal and the group. On the contrary, if the T distribution statistics corresponding to the group are not greater than T1, it is determined that there is no significant difference between the to-be-identified identification signal and the group.

The degree of freedom of the group is equal to a quantity of historical signal records in the group minus 1. The significance level a is a preset value. In a specific example, the significance level a may be set to 0.1.

If there is no significant difference between the to-be-identified identification signal and any group, step 806 is performed.

If there is a significant difference between the to-be-identified identification signal and each group, step 807 is performed.

A specific determining manner in 805 is the following. For a group, calculate a difference between the RSSI data of the to-be-identified identifier signal and the T distribution statistics of the group; if the calculated difference falls within a preset difference range, determining that there is no significant difference between the RSSI data of the to-be-identified identifier signal and the T distribution statistics of the group; or if the calculated difference does not fall within the preset difference range, determining that there is a significant difference between the RSSI data of the to-be-identified identifier signal and the T distribution statistics of the group.

806: Determine that a source Bluetooth positioning device of the to-be-identified identification signal is a Bluetooth positioning device corresponding to a group that has no significant difference.

In an example, assuming that the first electronic device in 805 determines that there is no significant difference between the RSSI data of the to-be-identified identification signal and T distribution statistics of a group corresponding to a Bluetooth positioning device A, the anti-tracking determines that the source Bluetooth positioning device of the to-be-identified identification signal is the Bluetooth positioning device A, that is, the to-be-identified identification signal is sent by the Bluetooth positioning device A.

807: Determine whether the sliding window reaches an end of a signal data list.

If yes, the first electronic device determines that the source Bluetooth positioning device of the to-be-identified identification signal is a new Bluetooth positioning device, that is, the source Bluetooth positioning device of the to-be-identified identification signal is different from all source Bluetooth positioning devices of the identification signal recorded in all historical signals, and this embodiment ends. If no, step 808 is performed.

A specific implementation of 807 is as follows:

Determining whether the signal data list has a historical signal record whose time stamp is earlier than a time period currently covered by the sliding window; if there is an earlier history signal record, determining that the sliding window does not reach the end of the signal data list; or if there is no earlier history signal record, determining that the sliding window reaches the end of the signal data list.

808: Move the sliding window forward based on a preset moving step.

A length of the moving step is the same as a length of the sliding window. For example, duration of the sliding window is one minute, and the moving step may also be set to one minute. In this case, 808 is equivalent to moving the sliding window forward by one minute.

Still, that the duration of the sliding window is one minute is used as an example, and a moment at which the to-be-identified identifier signal is obtained through scanning is recorded as T0. In this case, the sliding window set in 802 is T0-1 minute (min) to T0. After it is determined, based on a process from 803 to 805, that T distribution statistics of each group in the time period T0-1 min to T0 are significantly different from RSSI data of the to-be-identified identifier signal, 808 is performed, and the sliding window is moved forward by one minute. In this case, the sliding window is T0-2 min to T0-1 min, and if there is a significant difference between the T distribution statistics of each group in the time period T0-2 min to T0-1 min and RSSI data of the to-be-identified identifier signal, the sliding window is moved forward another minute until the end of the data list.

Optionally, to improve accuracy of the identification signal merging in this embodiment, before 806 is performed, it may be determined whether duration of the sliding window is extended. If yes, 806 is performed. If no, the duration of the sliding window is extended to 2 minutes. Then, a process of 803 to 805 is performed on a historical signal record whose time stamp is in the extended sliding window, so as to identify the source Bluetooth positioning device of the to-be-identified identification signal.

In some optional implementations, the first electronic device cleans the signal data list, so as to help reduce storage space occupied by the signal data list. The first electronic device may clean the signal data list in a plurality of implementation manners.

For example, the first electronic device may clean the signal data list in any one or more of the following manners:

1. The first electronic device may set a timer. The timer is reset to zero and re-timed every time the timer reaches a specific time period, and the first electronic device clears the stored signal data list every time the timer is reset to zero.

2. The first electronic device may set an upper limit of data volume of the signal data list, for example, the data recorded in the signal data list may be set to a maximum of 2 MB. Whenever the signal data list is full, that is, when the data stored in the signal data list reaches the upper limit of the data volume, the first electronic device deletes, from the signal data list in a recorded time sequence, the specific quantity of data that is first stored in the signal data list, for example, deletes the 10 KB data that is first stored in the signal data list, so as to write new data, and so on.

3. Before cleaning the signal data list each time, the first electronic device may determine whether there is a suspicious positioning device currently. If there is a suspicious positioning device, it is temporarily not cleaned. After a specific period of time, it is determined again whether there is a suspicious positioning device, and it is cleaned until it is determined that there is no suspicious positioning device. In this way, data related to the suspicious positioning device can be avoided from being cleaned, so as to ensure accuracy of a result of tracking detection.

The suspicious positioning device may be a Bluetooth positioning device whose track similarity between a corresponding positioning device track and a track of a mobile terminal track is close to a similarity threshold. For example, the suspicious positioning device may be a positioning device whose corresponding track similarity is less than the similarity threshold and greater than 90% of the similarity threshold.

For example, the similarity threshold may be 0.7. The first electronic device calculates that a track similarity between a positioning device track corresponding to a Bluetooth positioning device 1 and the mobile terminal track is 0.64, which is less than the similarity threshold, but greater than 90% of the similarity threshold, that is, greater than 0.63. Therefore, the first electronic device may determine that the Bluetooth positioning device 1 is a suspicious device.

A track similarity calculation part is implemented by the first electronic device, and a specific implementation manner of calculating the track similarity is as follows:

In some possible embodiments, both the mobile terminal track and the positioning device track may include a plurality of types of location information, for example, may include three types of information: a base station identifier, a network identifier, and geographical coordinates. Therefore, when calculating the track similarity, the first electronic device may perform calculation by integrating the plurality of types of location information of the mobile terminal track and the positioning device track.

For example, when the first electronic device calculates the track similarity, if both the mobile terminal track and the positioning device track include a plurality of types of location information, the first electronic device separately calculates a similarity for each type of location information, and determines an average value of the calculated similarities as the track similarity. If the mobile terminal track and/or the positioning device track include only one type of location information, a similarity of this type of location information is calculated, and a calculation result is determined as the track similarity.

If the mobile terminal track and the positioning device track include only a same type of location information, the first electronic device calculates a similarity of this type of location information, and determines a calculation result as the track similarity.

A mobile terminal track 1 and a positioning device track 2 are used as examples. If both the track 1 and the track 2 include a base station identifier, a network identifier, and geographical coordinates, the first electronic device separately calculates similarity between the base station identifier of the track 1 and the base station identifier of the track 2, the network identifier of the track 1 and the network identifier of the track 2, the similarity between the geographical coordinates of the track 1 and the geographical coordinates of the track 2, and then determines an average value of the three similarities as the track similarity of the track 1 and the track 2.

If the track 1 and the track 2 include only the base station identifier, the first electronic device calculates the similarity between the base station identifier of the track 1 and the base station identifier of the track 2, and determines a calculation result as the track similarity between the track 1 and the track 2.

With reference to FIG. 11, a method for calculating a similarity of a base station list in an embodiment of this application is described. FIG. 11 is a flowchart of the method for calculating the similarity of the base station list according to an embodiment.

901: Read a base station identifier of a mobile terminal track.

902: Read a base station identifier of a positioning device track.

903: Set a base station weight corresponding to each base station identifier in the mobile terminal track based on residence time.

Still referring to FIG. 11, the Bluetooth host may perform the following steps on each base station identifier in the mobile terminal track, so as to set a base station weight corresponding to each base station identifier in the mobile terminal track.

931: Compare residence time of the base station identifier and a broadcast interval.

If a comparison result is that the time is not less than the interval, that is, the residence time of the base station identifier is not less than the broadcast interval, step 932 is performed.

The broadcast interval is an interval at which the Bluetooth positioning device sends the identification signal. The Bluetooth positioning device usually sends the identification signal periodically. For example, the Bluetooth positioning device may broadcast an identification signal every 6 seconds, and the broadcast interval is 6 seconds (s).

If the comparison result is that the time is less than the interval, that is, the residence time of the base station identifier is less than the broadcast interval, step 933 is performed.

The residence time of the base station identifier refers to a time at which the electronic device accesses the base station corresponding to the base station identifier. For example, if the electronic device accesses a base station corresponding to a base station identifier cell-ID1 at a moment T0, and separates from a coverage range of the base station corresponding to the cell-ID1 at a moment T1, residence time corresponding to the base station identifier cell-ID1 is T1−T0.

Optionally, the electronic device may also calculate the residence time of the base station identifier in the following manner:

After the electronic device accesses a base station corresponding to a base station identifier, the first electronic device identifies a network standard of the base station. Because a transmission distance of a signal of each network standard is relatively fixed, the first electronic device may determine a coverage range of the base station (that is, a cell range of the base station) based on the network standard of the base station, predict a moving distance of the electronic device within the coverage range of the base station based on a current location of the electronic device, and finally divide the moving distance by a current moving speed of the electronic device, so as to predict a time at which the electronic device accesses the base station.

932: Set a base station weight corresponding to the base station identifier to 1.

933: Calculate a ratio of the residence time of the base station identifier to the broadcast interval.

934: Set the base station weight corresponding to the base station identifier as the ratio.

The base station identifier cell-ID1 in a mobile terminal track is used as an example. A matching module compares residence time T (1) corresponding to the cell-ID1 and a broadcast interval 6 s. If T (1) is greater than or equal to 6 s, it is set that a base station weight C (1) corresponding to the cell-ID1 is equal to 1. If T (1) is less than 6 s, T (1) is divided by 6 s to obtain a ratio. For example, T (1) is equal to 4.8 s, the ratio obtained through calculation is 0.8, and it is set that the base station weight C (1) corresponding to the cell-ID1 is equal to 0.8.

After a corresponding base station weight is set for each base station identifier in the mobile terminal track, the matching module performs step 405 to add base station weights of all base station identifiers in the mobile terminal track to obtain a weight sum.

In an example, the mobile terminal track includes base station identifiers cell-ID1, cell-ID2, and cell-ID3, and corresponding base station weights that are set according to 400 are successively C (1)=1, C (2)=0.6, and C (3)=0.9, and the weight sum obtained by calculation by 405 is 2.5.

904: Add base station weights of all base station identifiers in the mobile terminal track to obtain a weight sum.

905: Count a total quantity of base station identifiers in the positioning device track.

906: Divide the total quantity of base station identifiers by the weight sum to obtain a similarity of the base station identifier.

Each base station identifier mentioned in the embodiment shown in FIG. 11 refers to each base station identifier that is different from each other. When a plurality of same base station identifiers are repeatedly added to the mobile terminal track or the positioning device track, the plurality of same base station identifiers are considered as only one base station identifier.

For example, if the weight sum corresponding to the mobile terminal track is 2.5 and the total quantity of base station identifiers of the positioning device track is 2, the similarity between the base station identifier of the mobile terminal track and the base station identifier of the positioning device track is calculated as 2 divided by 2.5, that is, 0.8.

For a method for calculating the similarity between the network identifier of the mobile terminal track and the network identifier of the positioning device track, refer to the method for calculating the similarity of the base station identifier shown in FIG. 11. Only the base station identifier in the embodiment shown in FIG. 11 needs to be replaced with the network identifier, and residence time corresponding to the base station identifier needs to be replaced with residence time corresponding to the network identifier. Details are not described again. The residence time corresponding to the network identifier refers to duration in which the electronic device accesses the wireless local area network corresponding to the network identifier.

The similarity of geographical coordinates is calculated as follows:

The first electronic device detects, one by one, whether a distance between geographical coordinates of the mobile terminal track and geographical coordinates of the positioning device track is less than the distance threshold. When it is detected that a distance between one geographical coordinate of the mobile terminal track and one geographical coordinate of the positioning device track is less than the distance threshold, the first electronic device marks the two geographical coordinates as a pair of overlapping geographical coordinates. The first electronic device counts a ratio of a quantity of overlapping geographical coordinates to a total quantity of geographical coordinates of the mobile terminal track, to obtain a similarity between geographical coordinates of the mobile terminal track and geographical coordinates of the positioning device track.

For example, the distance threshold is set to 500 meters. It is assumed that the mobile terminal track includes 10 geographical coordinates, which are sequentially denoted as coordinates 1.1 to 1.10, and the positioning device track includes 8 geographical coordinates, which are sequentially denoted as coordinates 2.1 to 2.8. After being detected, distances between coordinates 1.1 and 2.2, coordinates 1.3 and 2.3, coordinates 1.4 and 2.4, and coordinates 1.6 and 2.7 are all less than 500 meters. There are 4 pairs of overlapping geographical coordinates, and the calculated similarity between the geographical coordinates of the mobile terminal track and the geographical coordinates of the positioning device is 0.4.

After each time a new location information is added to one or more positioning device tracks, the first electronic device may perform the method for calculating track similarity provided in the foregoing embodiment, and calculate a track similarity between the mobile terminal track and a track of each positioning device that has new location information. If the track similarity between any one or more positioning device tracks and the mobile terminal track is greater than the similarity threshold, the first electronic device detects that the electronic device is tracked by the Bluetooth positioning device corresponding to the positioning device track, and prompts that the user is tracked by using a specific component of the electronic device or another device connected to the electronic device. For example, the first electronic device may prompt that the user is tracked when calculating that a similarity between the mobile terminal track and any one or more positioning device tracks is greater than 0.65.

Optionally, for each positioning device track, the first electronic device calculates a track similarity between the positioning device track and the mobile terminal track at regular intervals (for example, every 10 minutes). Alternatively, for each positioning device track, each time N pieces of location information are added to the positioning device track, the first electronic device calculates a track similarity between the positioning device track and the mobile terminal track once. N is a preset positive integer, and N may be set to 10 in an example.

Optionally, for each positioning device track, the first electronic device calculates a track similarity between the positioning device track and the mobile terminal track only when a quantity of location information included in the positioning device track reaches a specific quantity. For example, only when a quantity of location information included in a positioning device track is greater than or equal to 20, the first electronic device calculates a track similarity between the positioning device track and the mobile terminal track.

Figure 15:
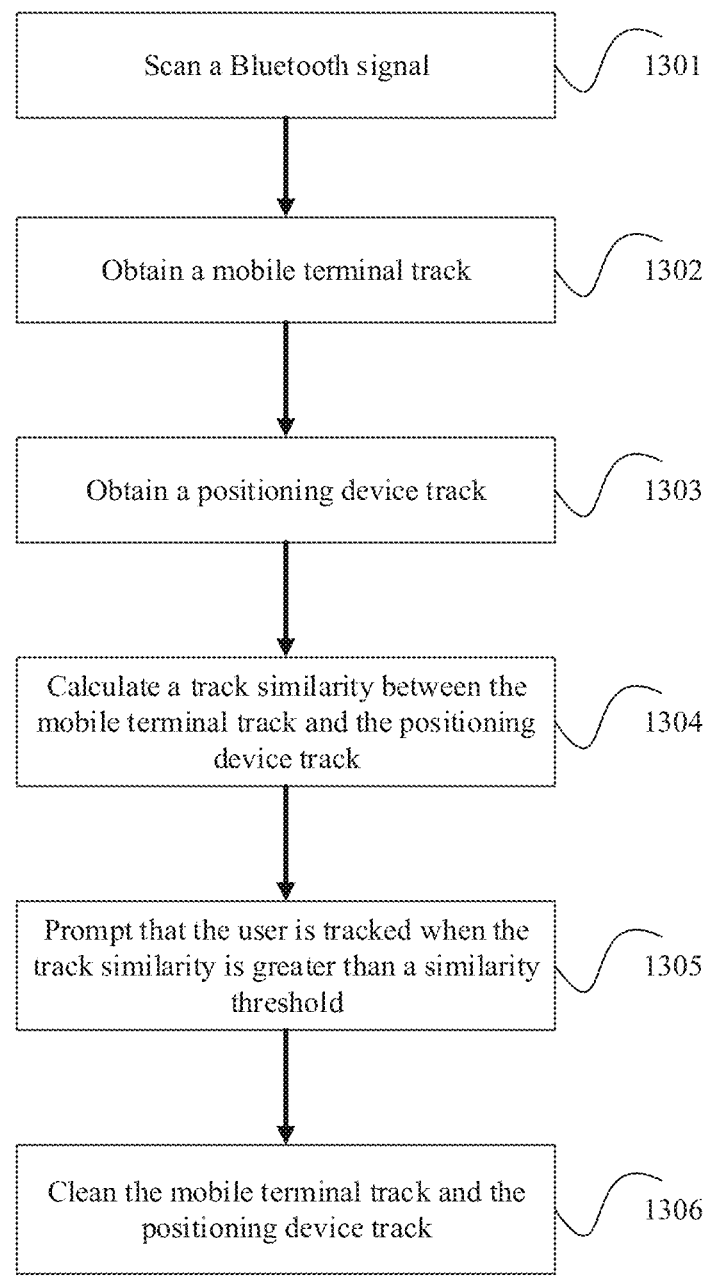
FIG. 15 is a flowchart of another Bluetooth positioning device detection method disclosed in an embodiment of this application.

FIG. 15 is a flowchart of a Bluetooth positioning device detection method according to an embodiment of this application. The Bluetooth positioning device detection method in this embodiment may include the following steps:

After a first electronic device starts to run, the first electronic device starts to perform the Bluetooth positioning device detection method in this embodiment.

1301: Scan a Bluetooth signal.

In 1301, the first electronic device may construct a signal filter, and configure the signal filter to a Bluetooth controller in a Bluetooth module, so that the Bluetooth module starts to scan the Bluetooth signal. For a specific implementation process of step 1301, refer to the foregoing step 302.

1302: Obtain a mobile terminal track.

In 1302, the first electronic device may continuously record location information of the first electronic device after receiving a status signal, and may record location information of the first electronic device each time an identification signal is received. A set of a plurality of pieces of location information recorded in this way is the mobile terminal track. For a specific implementation process of step 1302, refer to the foregoing steps 303 and 304.

1303: Obtain a positioning device track.

In 1303, the first electronic device may record location information of the first electronic device each time an identification signal of a Bluetooth positioning device is received. A set of a plurality of pieces of location information recorded in this way is the positioning device track corresponding to the Bluetooth positioning device. For a specific implementation process of step 1303, refer to the foregoing step 304.

1304: Calculate a track similarity between the mobile terminal track and the positioning device track.

In 1304, for a specific implementation process of the first electronic device and step 1304, refer to the foregoing step 305.

1305: Prompt that the user is tracked when the track similarity is greater than a similarity threshold.

In step 1305, the first electronic device may prompt that the user is tracked in a plurality of forms, such as a tone, a pop-up window, and a notification bar message. For a specific implementation process of step 1305, refer to the foregoing step 306.

1306: Clean the mobile terminal track and the positioning device track.

In step 1306, the first electronic device may delete positioning device tracks corresponding to some Bluetooth positioning devices, and delete some location information that belongs to the positioning device track and that belongs to the mobile terminal track. For a specific implementation process of step 1306, refer to the foregoing step 517.

When the first electronic device stops running, the Bluetooth positioning device detection method in this embodiment ends.

For specific implementation manners of the steps shown in FIG. 15, refer to descriptions of the foregoing corresponding parts. Details are not described herein again.

It should be noted that the steps shown in FIG. 15 are steps that may be performed when the Bluetooth positioning device detection method in this embodiment is implemented. In a specific implementation manner, the first electronic device may perform the steps in a sequence shown in FIG. 15, or perform the steps in another sequence.

In some optional embodiments of this application, the first electronic device may further present a moving track of the electronic device and a moving track of the Bluetooth positioning device on a specific display interface.

In an example, after turning on the first electronic device, the user may tap a "track display" button on an interface shown in FIG. 4a, and then the first electronic device presents an interface shown in FIG. 16. FIG. 16 is a schematic diagram of a display interface of a moving track according to an embodiment of this application.

Referring to FIG. 16, after the display interface is presented, the first electronic device invokes a map application on the electronic device, obtains a map 1401 within a specific range centered on a current location of the electronic device, and displays the obtained map on the display interface of a moving track.

Then, the first electronic device draws a curve 1402 representing the mobile terminal track on the map. A manner of drawing a curve by the first electronic device is as follows:

The first electronic device determines coordinate points corresponding to all geographical coordinates and all network identifiers in the mobile terminal track on the map. When determining a coordinate point, the first electronic device determines, for geographical coordinates, the coordinate point indicated by the geographical coordinates on the map as a coordinate point corresponding to the geographical coordinates. For a network identifier, the first electronic device finds, by using the network, a geographical location of a network interface device (for example, a router of the Wifi) corresponding to the network identifier, determines a coordinate point corresponding to a geographical location of the network interface device as a coordinate point corresponding to the network identifier, and determines a found geographical location as a geographical location corresponding to the location information. After the coordinate points are determined, the first electronic device may obtain the curve 1402 that represents the mobile terminal track and that is shown in FIG. 16 by connecting the coordinate points.

After the curve representing the mobile terminal track is drawn, the first electronic device marks a coordinate point corresponding to each piece of location information of the positioning device track on the map. A method for determining the coordinate point is the same as the method for drawing the mobile terminal track, and details are not described again. As shown in FIG. 16, to distinguish different Bluetooth positioning devices, the first electronic device may indicate coordinate points of different Bluetooth positioning devices by using marks of different shapes.

Optionally, when drawing the curve representing the mobile terminal track, if there is too much location information recorded in the mobile terminal track, the curve may be drawn using only location information added in a recent period of time. For example, the curve is drawn using only location information recorded in the last 8 hours. Similarly, when marking the geographic location of the positioning device track, only the geographic location corresponding to the location information added within a recent period of time (for example, the last 8 hours) may be marked.

FIG. 16 is used as an example. After the user moves from an X cell to a Z park, the user turns on the first electronic device provided in this embodiment and enters the track display interface shown in FIG. 16. In a process in which the user moves from the X cell to the Z park, according to the embodiment shown in FIG. 3, the first electronic device records a moving track of a mobile phone of the user, and then draws the moving track on the map of the track display interface when the user enters the track display interface.

For another aspect, in the process of the user moves from the X cell to the Z park, the first electronic device separately obtains identification signals from two different Bluetooth positioning devices. The two Bluetooth positioning devices are respectively represented by a device 1 and a device 2. According to the embodiment shown in FIG. 3, each time the first electronic device obtains the identification signal of the device 1, the first electronic device records location information of a current user's mobile phone in a moving track of the device 1, and each time the first electronic device obtains the identification signal of the device 2, the first electronic device records location information of a current user's mobile phone in a moving track of the device 2.

Based on moving tracks of the device 1 and the device 2, the first electronic device marks, in the track display interface shown in FIG. 16, a coordinate point when identification information of the device 1 is received and a coordinate point when identification information of the device 2 is received. By observing tracks shown in FIG. 16, the user can find that the user may be tracked by the device 2.

In some optional embodiments, when detecting that the mobile phone is tracked by a plurality of Bluetooth positioning devices at the same time, the first electronic device may determine, based on RSSI data of an identification signal sent by each Bluetooth positioning device used to track, a distance between each Bluetooth positioning device used to track and the mobile phone, and then output a tracking prompt only for a Bluetooth positioning device whose distance from the mobile phone is less than a preset alarm threshold.

The alarm threshold may be set by the user based on a travel mode. For example, when the user travels by foot and by public transportation, only a Bluetooth positioning device that is placed in a portable item of the user (such as a handbag) may be used to track the user in this case. Therefore, the user may set the alarm threshold to 50 centimeters. When the user travels by car, a Bluetooth positioning device that is placed in the user's car may also be used to track the user. Therefore, the user may set the alarm threshold to 1 meter.

The following describes a use process of the first electronic device according to an embodiment of this application with reference to a specific example. After a user A installs the first electronic device on a mobile phone, the user A sets, on an interface shown in FIG. 4b, that the first electronic device runs in a background when the mobile phone is in a wake-up state (that is, a screen of the mobile phone is on). Based on the foregoing setting, each time when the screen of the mobile phone is on, the first electronic device scans the Bluetooth signal in the foregoing manner. For one aspect, each time the mobile phone of the user A receives a status signal, the first electronic device adds location information of the mobile phone currently to a mobile terminal track. For another aspect, after each time an identification signal is obtained, the first electronic device adds location information of the mobile phone A when the identification signal is obtained to a positioning device track corresponding to the identification signal.

With reference to the foregoing example, it is assumed that after one hour of operation of the first electronic device, three positioning device tracks are recorded, which are respectively a positioning device track corresponding to a Bluetooth positioning device 100, a positioning device track corresponding to a Bluetooth positioning device 200, and a positioning device track corresponding to a Bluetooth positioning device 300. In this case, the first electronic device calculates, according to the foregoing method for calculating a track similarity, that the track similarity between the positioning device track corresponding to the Bluetooth positioning device 300 and the mobile terminal track is greater than the similarity threshold. Therefore, the first electronic device determines that the Bluetooth positioning device 300 is tracking the user A, and further prompts that the user is tracked.

The first electronic device provided in this embodiment of this application may run on an application processor AP in a processor shown in FIG. 1, and a computing capability of the application processor is relatively strong. Therefore, when the first electronic device runs on the application processor, recording of the mobile terminal track and the positioning device track, and calculation of the track similarity can be realized more quickly.

The first electronic device may also run on an intelligent sensorhub (sensorhub) in the processor shown in FIG. 1. The sensorhub is a processor that is configured on the electronic device and that is connected to various types of sensors and that is specifically configured to process data of each sensor. Compared with the AP, the sensorhub has a relatively weak computing capability and low power consumption during running. Therefore, when the first electronic device continuously runs in the background, the first electronic device may run on the sensorhub, so as to avoid increasing power consumption of the electronic device.

When the first electronic device runs on the sensorhub, the first electronic device may interact with the AP to obtain the location information of the electronic device.

An embodiment of this application further provides a computer storage medium, configured to store a computer program. When the computer program is executed, the computer program is specifically configured to implement the Bluetooth positioning device detection method provided in any embodiment of this application.

An embodiment of this application further provides a computer program product, including a plurality of executable computer instructions. When the computer instruction of the product is executed, the computer program product is specifically configured to implement the Bluetooth positioning device detection method provided in any embodiment of this application.

What is claimed is:

1. A Bluetooth positioning device detection method, applied to a first electronic device, wherein the method comprises:
    recording first location information, wherein a set of the first location information is used as a first track, and the first track is a moving track of the first electronic device;
    recording second location information when a preset trigger condition is met, wherein a set of the second location information is used as a second track, and the second track is used to represent a moving track of a Bluetooth positioning device;
    calculating a similarity between the first track and the second track in a preset time period; and
    determining that the first electronic device is tracked by the Bluetooth positioning device if a track similarity is greater than a preset similarity threshold.

2. The detection method according to claim 1, wherein the recording first location information comprises:
    periodically recording the first location information of the first electronic device after a Bluetooth module of the first electronic device detects a preset Bluetooth status signal through scanning, wherein the Bluetooth status signal is sent by a second electronic device and the second electronic device is different from the first electronic device.

3. The detection method according to claim 1, wherein the trigger condition is that when a Bluetooth module of the first electronic device detects a preset Bluetooth identification signal through scanning, the Bluetooth identification signal is sent by the Bluetooth positioning device.

4. The detection method according to claim 1, wherein both the first location information and the second location information comprise a base station identifier of a base station currently accessed by the first electronic device.

5. The detection method according to claim 1, before the recording first location information, further comprising:
    constructing a signal filter in response to a preset enabling operation; and
    configuring the signal filter to a Bluetooth module of the first electronic device.

6. The detection method according to claim 5, wherein the constructing a signal filter in response to a preset enabling operation comprises:
    constructing the signal filter in response to a screen-on operation received by the first electronic device.

7. The detection method according to claim 5, wherein the signal filter comprises an identification signal filter used to filter a Bluetooth identification signal, and a status signal filter used to filter a Bluetooth status signal.

8. The detection method according to claim 1, wherein the calculating a similarity between the first track and the second track in a preset time period comprises:
    obtaining any one or a combination of a first similarity, a second similarity, and a third similarity, wherein the first similarity is a similarity between a base station identifier in the first track and a base station identifier in the second track; the second similarity is a similarity between a network identifier in the first track and a network identifier in the second track; and the third similarity is a similarity between geographical coordinates in the first track and geographical coordinates in the second track; and
    determining the track similarity based on any one or a combination of the first similarity, the second similarity and the third similarity.

9. The detection method according to claim 1, after the determining that the first electronic device is tracked by the Bluetooth positioning device, further comprising:
    prompting a user of the first electronic device that the user is tracked by the Bluetooth positioning device.

10. The detection method according to claim 9, wherein the prompting a user of the first electronic device that the user is tracked comprises:
    outputting a tracking prompt message in a message notification bar, wherein the tracking prompt message is used to indicate that the user is tracked.

11. A first electronic device, wherein the first electronic device comprises one or more processors, a memory, and a display, wherein
the memory is configured to store one or more programs; and
the one or more processors are configured to execute the one or more programs, so that the first electronic device performs the following steps:
recording first location information, wherein a set of the first location information is used as a first track, and the first track is a moving track of the first electronic device;
recording second location information when a preset trigger condition is met, wherein a set of the second location information is used as a second track, and the second track is used to represent a moving track of a Bluetooth positioning device;
calculating a similarity between the first track and the second track in a preset time period; and
determining that the first electronic device is tracked by the Bluetooth positioning device if a track similarity is greater than a preset similarity threshold.

12. The electronic device according to claim 11, wherein the recording first location information comprises:
periodically recording the first location information of the first electronic device after a Bluetooth module of the first electronic device detects a preset Bluetooth status signal through scanning, wherein the Bluetooth status signal is sent by a second electronic device and the second electronic device is different from the first electronic device.

13. The electronic device according to claim 11, wherein the trigger condition is that when a Bluetooth module of the first electronic device detects a preset Bluetooth identification signal through scanning, the Bluetooth identification signal is sent by the Bluetooth positioning device.

14. The electronic device according to claim 11, wherein both the first location information and the second location information comprise a base station identifier of a base station currently accessed by the first electronic device.

15. The electronic device according to claim 11, wherein before the recording first location information, the steps further comprise:
constructing a signal filter in response to a preset enabling operation; and
configuring the signal filter to a Bluetooth module of the first electronic device.

16. The electronic device according to claim 15, wherein the constructing a signal filter in response to a preset enabling operation comprises:
constructing the signal filter in response to a screen-on operation received by the first electronic device.

17. The electronic device according to claim 15, wherein the signal filter comprises an identification signal filter used to filter a Bluetooth identification signal, and a status signal filter used to filter a Bluetooth status signal.

18. The electronic device according to claim 11, wherein the calculating a similarity between the first track and the second track in a preset time period comprises:
obtaining any one or a combination of a first similarity, a second similarity, and a third similarity, wherein the first similarity is a similarity between a base station identifier in the first track and a base station identifier in the second track; the second similarity is a similarity between a network identifier in the first track and a network identifier in the second track; and
the third similarity is a similarity between geographical coordinates in the first track and geographical coordinates in the second track; and
determining the track similarity based on any one or a combination of the first similarity, the second similarity and the third similarity.

19. The electronic device according to claim 11, wherein after the determining that the first electronic device is tracked by the Bluetooth positioning device, the steps further comprise:
prompting a user of the first electronic device that the user is tracked by the Bluetooth positioning device.

20. The electronic device according to claim 19, wherein the prompting a user of the first electronic device that the user is tracked comprises:
outputting a tracking prompt message in a message notification bar, wherein the tracking prompt message is used to indicate that the user is tracked.

* * * * *